US012809813B2

(12) United States Patent
Hurkat et al.

(10) Patent No.: US 12,809,813 B2
(45) Date of Patent: Nov. 24, 2026

(54) SUPERSCALAR FIELD PROGRAMMABLE GATE ARRAY (FPGA) VECTOR PROCESSOR

(71) Applicant: Microsoft Technology Licensing, LLC, Redmond, WA (US)

(72) Inventors: Skand Hurkat, Bellevue, WA (US); Aaron Michael Landy, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 18/477,195

(22) Filed: Oct. 23, 2023

(65) Prior Publication Data

US 2025/0130971 A1 Apr. 24, 2025

(51) Int. Cl.
*G06F 9/30* (2018.01)
*G06F 15/78* (2006.01)

(52) U.S. Cl.
CPC ........ *G06F 15/7867* (2013.01); *G06F 9/3013* (2013.01)

(58) Field of Classification Search
CPC .. G06F 9/30036; G06F 9/3012; G06F 9/3887; G06F 15/7867
See application file for complete search history.

(56) References Cited

U.S. PATENT DOCUMENTS

| | | | | |
|---|---|---|---|---|
| 6,366,998 | B1 * | 4/2002 | Mohamed | G06F 9/3853 712/E9.035 |
| 9,135,003 | B2 | 9/2015 | Suh | |
| 10,877,925 | B2 | 12/2020 | Wallach | |
| 2018/0121386 | A1 * | 5/2018 | Chen | G06F 9/3888 |
| 2019/0065188 | A1 | 2/2019 | Shippy | |
| 2019/0108031 | A1 * | 4/2019 | Gonzalez | G06F 9/3861 |
| 2019/0171448 | A1 * | 6/2019 | Chen | G06F 9/30036 |
| 2021/0216318 | A1 * | 7/2021 | Langhammer | G06F 9/30072 |
| 2022/0382547 | A1 * | 12/2022 | Tran | G06F 9/3834 |
| 2023/0069890 | A1 * | 3/2023 | Kazakov | G06F 9/3888 |

OTHER PUBLICATIONS

"GPT-4 Technical Report", In repository of arXiv:2303.08774v3, Mar. 27, 2023, pp. 1-100.

"Intel® Hyperflex™ Architecture HighPerformance Design Handbook", Retrieved from: https://www.intel.com/content/www/us/en/docs/programmable/683353/21-3/fpga-architecture-introduction.html, Oct. 4, 2021, 147 Pages.

(Continued)

*Primary Examiner* — Jacob Petranek
(74) *Attorney, Agent, or Firm* — Ray Quinney & Nebeker P.C.; Tiffany B. Healy

(57) ABSTRACT

The present disclosure relates to a vector processor implemented on programmable hardware (e.g., a field programmable gate array (FPGA) device). The vector processor includes a plurality of vector processor lanes, where each vector processor lane includes a vector register file with a plurality of register file banks and a plurality of execution units. Implementations described herein include features for optimizing resource availability on programmable hardware units and enabling superscalar execution when coupled with a temporal single-instruction multiple data (SIMD).

20 Claims, 15 Drawing Sheets

(56) References Cited

OTHER PUBLICATIONS

"Intel® Stratix® 10 Device Datasheet", Retrieved from: https://www.intel.com/content/www/us/en/docs/programmable/683181/current/device-datasheet.html, Jan. 12, 2022, 133 Pages.
"Intel® Stratix® 10 Logic Array Blocks and Adaptive Logic Modules User Guide", Retrieved from: https://www.intel.com/content/www/us/en/docs/programmable/683699/current/lab-and-alm-overview.html, Mar. 27, 2022, 18 Pages.
"Vector Extension 1.0, frozen for public review", Retrieved from: https://github.com/riscv/riscv-v-spec/releases/tag/v1.0, Sep. 20, 2021, 111 Pages.
"UltraFast Design Methodology Guide for Xilinx FPGAs and SoCs", Retrieved from: https://docs.xilinx.com/viewer/book-attachment/PtlzBq2hPSpqxG0M~FEGkA/kXeyc0GPY_LwCuQjNXt2jA, Feb. 18, 2021, 311 Pages.
Ba, et al., "Layer Normalization", In Repository of arXiv:1607.06450v1, Jul. 21, 2016, pp. 1-14.
Boyd, Eric, "Introducing GPT-4 in Azure OpenAI Service", Retrieved from: https://azure.microsoft.com/en-us/blog/introducing-gpt4-in-azure-openai-service/, Mar. 21, 2023, 7 Pages.
Brown, et al., "Language Models are Few-Shot Learners", In Repository of arXiv:2005.14165v1, May 28, 2020, pp. 1-72.
Devlin, et al., "Bert: Pre-training of deep bidirectional transformers for language understanding", In Repository of arXiv:1810.04805v2, May 24, 2019, 16 Pages.
Espasa, et al., "Decoupled vector architectures", In Proceedings of Second International Symposium on High-Performance Computer Architecture, Feb. 3, 1996, pp. 281-290.
Espasa, et al., "Multithreaded Vector Architectures", In Proceedings Third International Symposium on High-Performance Computer Architecture, Feb. 5, 1997, pp. 237-248.
Espasa, et al., "Out-of-order vector architectures", In Proceedings of 30th Annual International Symposium on Microarchitecture, Dec. 3, 1997, pp. 160-170.
Espasa, et al., "Tarantula: A Vector Extension to the Alpha Architecture", In Journal of ACM SIGARCH Computer Architecture News, vol. 30 , No. 2, May 1, 2001, pp. 281-292.
Fowers, et al., "A configurable cloud-scale DNN processor for real-time AI", In Proceedings of ACM/IEEE 45th Annual International Symposium on Computer Architecture, Jun. 1, 2018, pp. 1-14.
Hendrycks, et al., "Gaussian Error Linear Units (GELUS)", In repository of arXiv:1606.08415v4, Jul. 8, 2020, pp. 1-9.
Hurkat, et al., "VIP: A Versatile Inference Processor", In Proceedings of IEEE International Symposium on High Performance Computer Architecture, Feb. 16, 2019, 14 Pages.
Jouppi, et al., "Ten Lessons from Three Generations Shaped Google's TPUv4i", In Proceedings of ACM/IEEE 48th Annual International Symposium on Computer Architecture, Jun. 14, 2021, pp. 1-14.
Kalamkar, et al., "A study of bfloat16 for deep learning training", In Repository of arXiv:1905.12322v1, May 29, 2019, 10 Pages.
Kozyrakis, et al., "Overcoming the limitations of conventional vector processors", In Proceedings of the 30th annual international symposium on Computer architecture, May 1, 2003, 11 Pages.
Laforest, et al., "Efficient multiported memories for fpgas", In Proceedings of the 18th annual ACM/SIGDA international symposium on Field programmable gate arrays, Feb. 21, 2010, pp. 41-50.
Laforest, et al., "Multi-ported memories for FPGAs via XOR", In Proceedings of the ACM/SIGDA international symposium on Field Programmable Gate Arrays, Feb. 22, 2012, pp. 209-218.
Langhammer, et al., "Stratix 10 NX Architecture and Applications", In Proceedings of the ACM/SIGDA International Symposium on Field-Programmable Gate Arrays, Feb. 28, 2021, pp. 57-67.
Putnam, et al., "A reconfigurable fabric for accelerating largescale datacenter services", In ACM SIGARCH Computer Architecture News, vol. 42, Issue 3, Jun. 14, 2014, pp. 13-24.
Quintana, et al., "Adding a vector unit to a superscalar processor", In Proceedings of the 13th international conference on Supercomputing, May 1, 1999, pp. 1-10.
Schneck, Paulb. , "Supercomputer architecture", In Publication of Kluwer Academic Publishers, 1987, 206 Pages.
Severance, et al., "VENICE: a compact vector processor for FPGA applications", In Proceedings of International Conference on Field-Programmable Technology, Dec. 10. 2012, pp. 261-268.
Smith, James E., "Decoupled access/execute computer architectures", In ACM SIGARCH Computer Architecture News, vol. 10, Issue 3, Apr. 1, 1982, pp. 112-119.
Stephens, et al., "The ARM scalable vector extension", In Journal of IEEE Micro, vol. 37, Issue: 2, Mar. 2017, pp. 26-39.
Vaswani, et al., "Attention is All You Need", In Proceedings of Advances in Neural Information Processing Systems, vol. 30, Dec. 4, 2017, 11 Pages.
Beldianu, et al., "ASIC Design of Shared Vector Accelerators for Multicore Processors", 26th International Symposium on Computer Architecture and High-Performance Computing, IEEE, Oct. 22, 2014, pp. 182-189.
International Search Report and Written Opinion received for PCT Application No. PCT/US2024/050297, Feb. 10, 2025, 15 pages.
International Preliminary Report on Patentability (Chapter I) received for PCT Application No. PCT/US2024/050297 mailed on May 7, 2026, 09 Pages.

* cited by examiner

900

SUPERSCALAR FIELD PROGRAMMABLE GATE ARRAY (FPGA) VECTOR PROCESSOR

BACKGROUND

Recent years have seen a rise in the use of programmable hardware to perform various computing tasks. It is now common for many computing applications to make use of programmable arrays of blocks to perform various tasks. These programmable blocks of logic, memory, and arithmetic blocks provide a useful alternative to application-specific integrated circuits having a more specialized or specific set of tasks. For example, field programmable gate arrays (FPGAs) provide programmable blocks that can be programmed individually and provide significant flexibility to perform various tasks.

Neural networks, particularly large language models (LLMs), are becoming increasingly popular in the datacenter. These networks comprise matrix multiplications and other operations. Current solutions typically focus on accelerating matrix multiplication operations, other operations can limit the performance of a neural network accelerator. Vector processing is a natural fit for accelerating these operations.

However, building a high-performance vector processor on an FPGA is challenging due to the limited number of building blocks available on the FPGA. For example, because programmable hardware units typically have a rigid structure of elements, such as lookup tables, adder chains, and dedicated memory that follow a distinct set of protocols and timing constraints, implementing typical processors on programmable hardware is often inefficient and results in undesirable latencies with respect to issuing and processing various instructions. As a result, current solutions have changed the software abstraction for vector processors, either by using a vector memory-memory paradigm, or a dataflow paradigm, which requires changes to the software stack including the compiler, making adoption challenging.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a processor implemented on programmable hardware. The processor includes a vector controller configured to receive instructions for execution on the processor and provide control signals to a plurality of vector lanes; and the plurality of vector processor lanes where each vector processor lane of the plurality of vector processor lanes includes: a vector register file with a plurality of register file banks to store data; a load unit with a plurality of first in first out queues that loads the data into the plurality of register file banks; a plurality of execution units configured to perform operations on the data in each of the plurality of register file banks and execute the instructions from the instruction issue queue; and a store unit with a plurality of first in first out queues that reads the data from each of the plurality of register file banks.

Some implementations relate to a method. The method includes receiving an instruction for execution using a vector processor. The method includes providing, to each vector processor lane of a plurality of vector processor lanes in the vector processor, control signals for the instruction in response to determining to issue the instruction, wherein each vector processor lane performs operations on a subset of the data in parallel. The method includes performing, using a plurality of execution units in each vector processor lane, the operations on data in a plurality of register file banks within each vector processor lane.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

DETAILED DESCRIPTION

Figure 1:
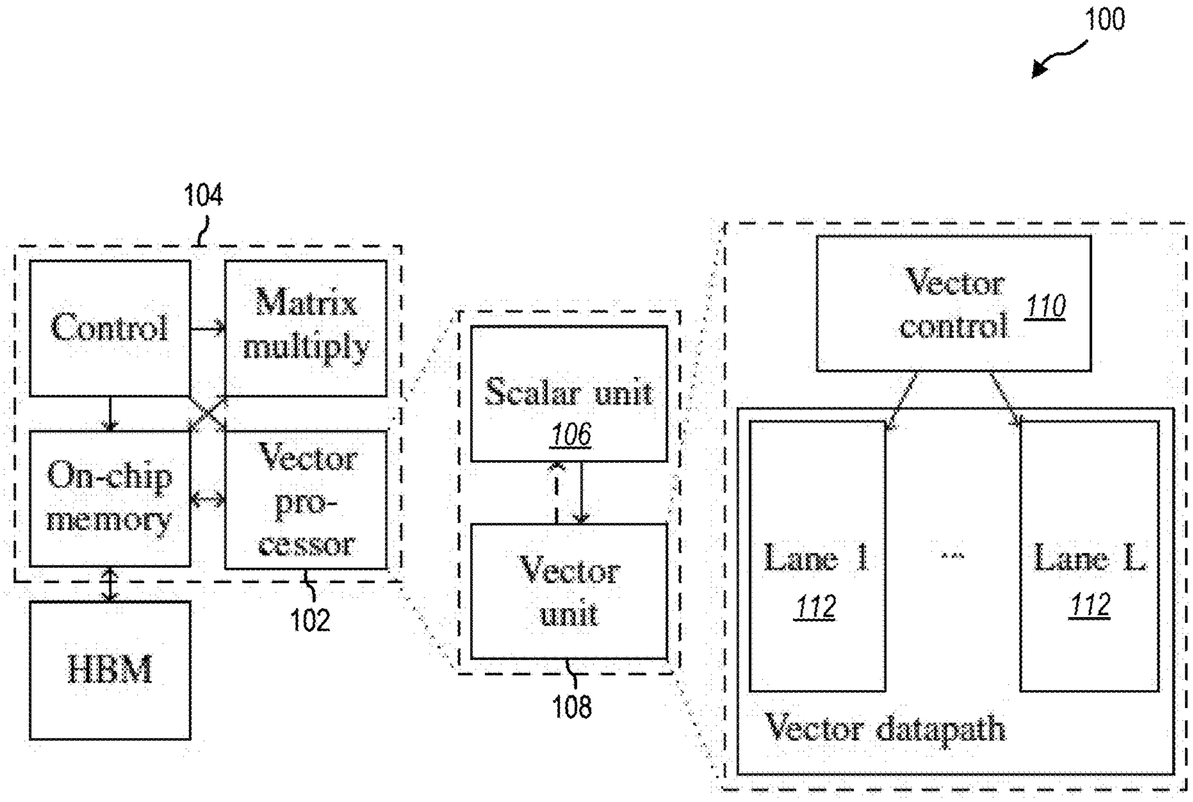
FIG. 1 illustrates an example hardware environment including an example vector processor on a programmable hardware component in accordance with implementations of the present disclosure.

The present disclosure is generally related to a vector processor overlay on a programmable hardware unit (e.g., an FPGA). FPGAs offer a limited variety of logic, arithmetic, and memory primitives, a rigid interconnect architecture, and a fixed fabric topology. Achieving both high clock frequency and high resource utilization is challenging and requires careful consideration of the device primitives and limitations when micro architecting the design. Current device vendor design guidelines require aggressively pipelined logic implementations. To avoid costly routing delays, both datapath and control logic should be feed-forward, stall-free, and low-fanout with minimized logic depth and sparse reset usage. Connections between logic placed in distant regions of the device must be pipelined with one or more feed-forward stages. Floorplan restrictions and high-latency connection requirements must be considered early and often in the design process to ensure that a final design can be efficiently placed and routed at high frequency on the target device. To minimize resource utilization and logic depth, and therefore critical path, of each pipeline stage, all modules should be designed and implemented to compose efficiently from the available building blocks on the device.

Minor deviation from the constraints of the device primitives of FPGAs, such as exceeding the number of inputs to a single lookup table (LUT), exceeding the fanout drive strength of any module's output, or using memory control signals not natively implemented by the available SRAMs can significantly increase resource utilization and critical path delays. In high-density designs with high resource utilization and heavy routing congestion, small microarchitecture inefficiencies in replicated logic can quickly degrade the maximum frequency of the design.

Neural networks, particularly large language models (LLMs) are becoming increasingly popular in the datacenter. These networks comprise matrix multiplications and other operations. Current solutions typically focus on accelerating matrix multiplication operations, other operations can limit the performance of a neural network accelerator. Vector processing is a natural fit for accelerating these operations.

However, building a high-performance vector processor on an FPGA is challenging due to the limited number of building blocks available on the FPGA. Current solutions have changed the processing paradigm to either a vector memory-memory paradigm, or a dataflow paradigm. The changes required to the software stack including application code, compilers, and firmware make adoption of the current solutions challenging.

Most FPGA SRAMs provide only one read and write port each. The systems and methods of the present disclosure provide a vector processor on a programmable hardware unit (e.g., an FPGA) using a vector register file paradigm where instructions operate upon data stored in registers in the register file, with results of operations also written to a register file. Instructions may be provided to move data between register file and memory. The systems and methods of the present disclosure use a banked vector register file, where each bank is accessed (read from or written to) in sequential order to emulate a multi-port vector register file that can keep multiple execution units busy. In some implementations, the execution units use a combination of temporal and spatial single-instruction multiple data (SIMD) paradigms, processing an instruction over multiple cycles and using multiple parallel execution units. In some implementations, the execution units use temporal SIMD to process an instruction over multiple cycles.

Implementations described herein include features and functionality for optimization of resource availability on programmable hardware units and enabling multi-issue, superscalar execution when coupled with a temporal SIMD paradigm for vector execution using a vector register file processing paradigm. The present disclosure includes a number of practical applications that provide benefits and/or solve problems associated with a vector processor in a programmable hardware unit environment. Examples of these applications and benefits are discussed in further detail below.

The vector processor refers to a processing architecture including a scalar unit that handles fetching, decoding, and forwarding instructions. A vector processor further includes a vector unit for issuing and executing instructions. The vector unit may include a control unit and a datapath. The datapath includes one or more lanes.

A vector processor may further include a plurality of lanes having a feed-forward design being configured to receive control signals to drive the lanes to complete various vector operations. Each of the lanes include a banked vector register file (e.g., a plurality of register file banks), where each register file bank is accessed (read from or written to) in sequential order. Each of the lanes may include a plurality of execution units thereon to perform an operation or set of related operations in the data in the plurality of register file banks. All of the lanes in the vector processor operate in lockstep with each other, controlled using a single vector control unit. In some implementations described herein, a vector processor issues instructions to execution units to perform one or more operations in accordance with a set of instructions.

The vector processor uses temporal SIMD to time-multiplex register file banks in the vector processor to keep multiple hardware execution units busy in the vector processor. Spatial SIMD refers to spreading the execution of a single instruction among different execution units in space. For example, to achieve spatial SIMD, the vector processor uses multiple execution units that are configured to do the same function and stamped out in a parallel configuration with a shared control unit. The vector processor uses the multiple execution units to perform the same instruction on different pieces of data. Elements of the vector are distributed amongst the lanes of the vector processor, such that each lane performs computation on a different element of a vector. Temporal SIMD refers to executing a single instruction over multiple data in the time domain. To achieve temporal SIMD in the vector processor, the vector processor executes different vector elements in different pipeline stages. Each instruction operates on a fixed number of vector elements that are accessed sequentially in time. The length of time over which an instruction is executed is referred to as the vector chime (chain execution time).

The vector processor also includes a vector processor controller that receives an instruction for execution on at least one execution unit of a vector processor. In some implementations, upon receiving the instruction, the vector processor controller places the instruction in an issue queue that stages instructions before being issued. The vector processor controller further applies one or more hazard trackers to issued instructions to determine whether the instructions may be issued safely. In the event that the hazard tracker(s) identifies a potential issue, the vector processor controller may reset the instructions to the earliest instruction not successfully issued.

In some implementations, the vector processor uses software that exploits the heterogeneity present in the hardware execution units to reduce both execution time and FPGA resources needed in the vector processor to process the data. In some implementations, the software fuses multiple phases of a multi-phase operation so the vector processor processes the multiple phases together averaging the hardware requirements required for the multi-phase operation and allowing more execution units to be busy at a time.

One technical advantage of the systems and methods of the present disclosure include using a standard vector register file process paradigm in the vector processor. Another technical advantage of the systems and methods of the present disclosure includes the vector processor achieving a high frequency. Another technical advantage of the systems and methods of the present disclosure is a decrease in execution time in processing data of the vector processor.

Another technical advantage of the systems and methods of the present disclosure includes decreasing FPGA resources required to process data. Another technical advantage of the systems and methods of the present disclosure include configurability of design of the vector processor. Another technical advantage of the present disclosure includes superscalar execution (more than one instruction executing simultaneously) on the vector processor. Superscalar execution allows for reduced execution time and reduced FPGA resources.

As illustrated in the foregoing discussion, the present disclosure utilizes a variety of terms to describe features and advantages of the systems herein. Additional detail is now provided regarding the meaning of some example terms.

For example, as used herein, a "hazard" refers to an instance of a problem in an instruction pipeline in which an instruction cannot be executed without risking an incorrect computational result. A hazard may refer to a data hazard, such as in the event where data is not yet available, or where available data may be overwritten before it is used. One example data hazard includes a read-after-write data hazard. The data read must reflect the written data. Another example data hazard includes a write-after-read data hazard. The write must not overwrite the data before it is read. Another example data hazard includes a write-after-write data hazard. Data from a first write should not overwrite data from a second write. Another example type of data hazard mentioned herein is a memory hazard. As another example, a hazard may refer to a structural hazard, such as a hazard caused by a lack of availability of hardware resources (e.g., an execution unit or a memory port). In some implementations, availability hazards refer to any hazard caused by a lack of availability of data and/or hardware resource.

As used herein, a "register file" refers to a hardware unit in which data may be written to or read from in accordance with implementations described herein. In some implementations, a register file includes multiple register file banks on which instances of data may be written to and stored over one or more cycles (e.g., clock cycles). In some implementations, data is replicated across register file banks to simulate multiple input/output ports. A register file contains multiple registers.

Additional detail will now be provided regarding examples of a vector processor in relation to illustrative figures portraying example implementations.

Referring now to FIG. 1, illustrated is an example hardware environment 100 of a hardware component 104. In some implementations, the hardware component 104 is a neural network accelerator that includes a matrix multiplication unit, a vector processor 102, on-chip memory, and a control plane that orchestrates the execution to the accelerator. Example operations performed by the hardware component 104 include SoftMax, layer normalization, and Gaussian error linear unit (GELU).

In some implementations, the vector processor 102 refers to a vector processor on a hardware component 104, such as an FPGA component on an FPGA device having multiple components. As an example, the vector processor 102 on the hardware component 104 refers to a vector processor implemented on an FPGA overlay and optimized for utilization of a variety of logic modules on the FPGA device. In some implementations, the features described herein in connection with example vector processors may similarly apply to processors that use digital signal processing blocks, memories for storage, and other processing components.

The vector processor 102 may include a number of components thereon including, by way of example, a scalar unit 106, and a vector unit 108 that includes a vector controller 110 and a plurality of vector processor lanes 112. The vector processor lanes 112 operate in lockstep with each other. In some implementations, the vector processor lanes 112 receive a portion of the vector and each of the vector processor lanes 112 performs a same operation on the portion of the vector in parallel. Additional information in connection with each of these components 106-112 will be discussed in further detail below.

Figure 2:
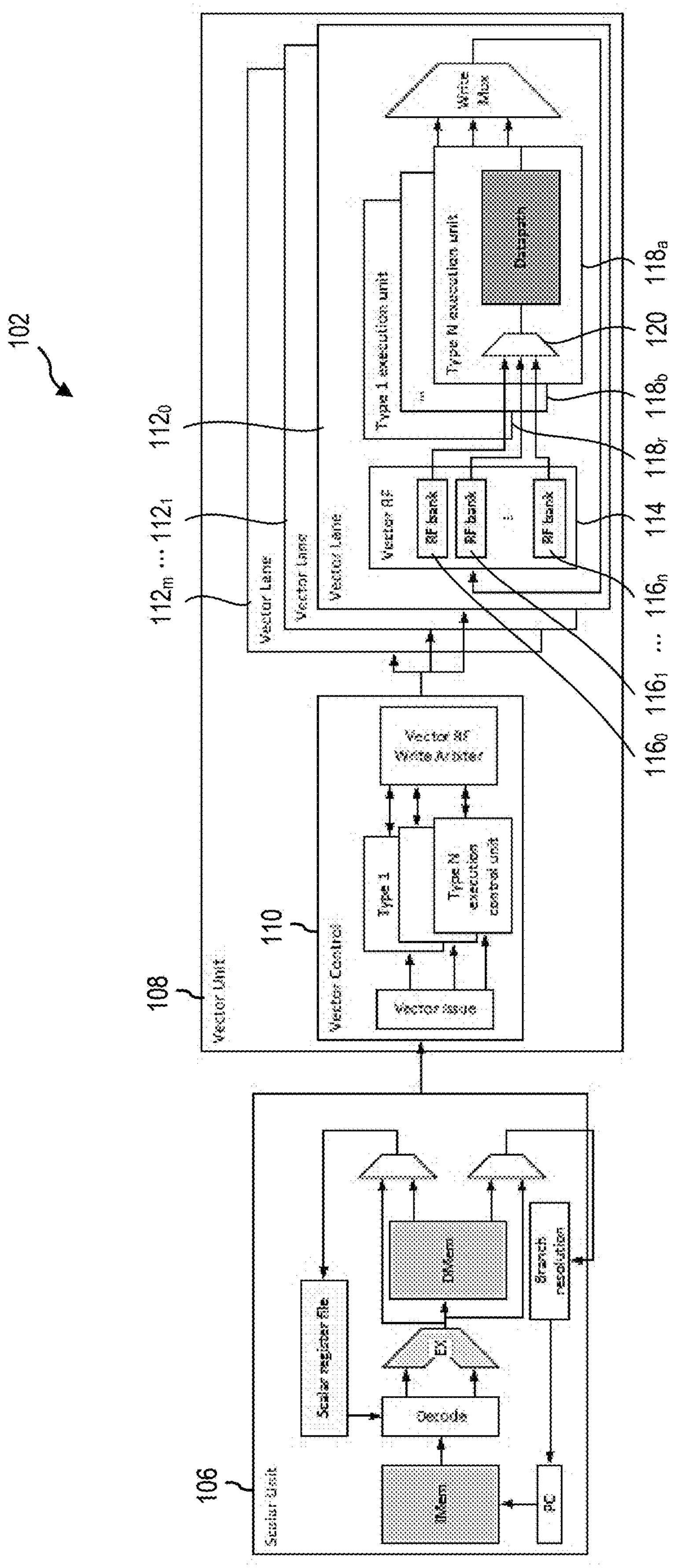
FIG. 2 illustrates an example vector processor in accordance with implementations of the present disclosure.

Referring now to FIG. 2, illustrated is an example vector process 102. The vector processor 102 includes a scalar unit 106. The scalar unit 106 refers to hardware of the vector processor 102 that handles tasks related to fetching and decoding instructions and executing scalar instructions. In some implementations, the scalar unit 106 forwards vector instructions to a vector unit 108 for execution. In some implementations, the scalar unit 106 expands instructions prior to forwarding the instructions to the vector unit 108. In some implementations, the scalar unit 106 includes a number of components, including scalar register files, units of memory, arithmetic units, multiplexors, decoders, and other hardware.

The vector processor 102 also includes a vector controller 110. The vector controller 110 may refer to a control unit of the vector processor 102 configured to control the pipeline of instructions to a plurality of vector processor lanes 112 (e.g., the vector processor lanes $\mathbf{112}_0$, $\mathbf{112}_1$ to $\mathbf{112}_m$ (where m is a positive integer)). The vector controller 110 manages forwarding instructions to the respective vector processor lanes 112. In some implementations, the vector controller 110 manages an instruction issue queue for the instructions. In some implementations, the vector controller 110 includes a plurality of hazard trackers configured to track and detect different types of hazards related to issuing and forwarding instructions by the vector controller 110. Examples of hazard trackers include structural availability hazard trackers (e.g., execution unit occupancy hazard tracker, register file availability hazard tracker), data availability hazard trackers, and memory hazard tracker(s). While the scalar unit 106 is illustrated as a separate unit from the vector controller 110, in some implementations, the scalar unit 106 and the vector controller 110 are combined together.

The vector processor 102 includes a plurality of vector processor lanes 112 (e.g., the vector processor lanes $\mathbf{112}_0$, $\mathbf{112}_1$ to $\mathbf{112}_m$). The plurality of vector processor lanes 112 includes hardware for carrying out or otherwise executing issued instructions by the vector controller 110. The vector processor 102 may include any number of vector processor lanes 112. In some implementations, a number of vector processor lanes 112 is selected in response to performance requirements of the programmable hardware (e.g., the hardware component 104 (FIG. 1) and available space on the programmable hardware. The number of vector processor lanes 112 is selected based on the throughput requirements and available area for the vector processor 102. When selecting the number of vector processor lanes 112 for the vector processor 102, the datapath width of a vector processor lane multiplied by a number of vector processor lanes multiplied by a number of register file banks must equal the vector length.

Each of the vector processor lanes 112 includes a vector register file 114 and a plurality of execution units 118 (e.g., $\mathbf{118}_a$, $\mathbf{118}_b$ up to $\mathbf{118}_r$, where r is a positive integer). The vector register file 114 includes a plurality of register file banks 116 (e.g., $\mathbf{116}_0$, $\mathbf{116}_1$ up to $\mathbf{116}_N$, where N is a positive integer) for storing instance of data and to feed multiple execution units 118. In some implementations, a number of execution units 118 equals a number of register file banks 116 (e.g., r equals N). In some implementations, a number of execution units 118 is different from a number of register file banks 116 (e.g., r is greater than N, or r is less than N). In some implementations, the number of execution units 118 and the number of register file banks 116 are selected in response to operations being performed by the vector processor 102.

In some implementations, the register file banks 116 feed multiple execution units 118 simultaneously. The plurality of register file banks 116 is used to simulate additional write and/or read ports. As mentioned above, the vector processor lanes 112 may have a simple feed-forward datapath. Control signals from the vector controller 110 may drive the vector processor lanes 112 to complete vector operations. The execution units 118 are configured to perform one operation or a set of related operations.

As noted above, the vector processor 102 may use a temporal and spatial SIMD paradigm. For example, the multiple vector processor lanes 112 may achieve the spatial paradigm by processing the same instruction across multiple data elements using the different lanes. The temporal SIMD paradigm may be achieved by requiring the instructions to process distinct elements of the vector processor 102 over multiple clock cycles (or simply "cycles"). In some implementations, a length of time over which an instruction is processed is referred to as a chime or chain execution time. While one or more instructions are executed over a particular chime, other independent instructions may be issued to other execution units 118 that are idle.

The execution units 118 read from or write to each register file bank 116 for a fixed number of cycles, cycling to a next register file bank 116 in the series freeing up the original bank to be read from or written to by a different hardware execution unit 118. While one execution unit 118 (e.g., execution unit $\mathbf{118}_a$) is reading from or writing to a certain register file bank 116 (e.g., register file bank $\mathbf{116}_1$) other execution units 118 (e.g., execution unit $\mathbf{118}_b$) can read from or write to other register file banks 116 (e.g., register file bank $\mathbf{116}_0$). While the register file banks 116 must be read from in order or written to in order, the order of the execution units 118 reading from a register file bank 116 or writing to a register file bank 116 is determined by the instruction stream and availability of the execution units 118. By allowing each execution unit 118 to cycle through the register file banks 116 in a fixed, round-robin order, the vector processor 102 creates multiple virtual read and write ports using only 1R1 W memory primitives. The vector processor 102 can create a virtual (2N)R(N)W memory using only 1R1 W memories available on the FPGA by using replication to double the number of read ports resulting in a (2N)R(N)W memory (where N is a positive integer). This utilization of execution units 118 enables superscalar execution within the vector processor 102 as multiple instructions can be executed simultaneously.

Figure 3:
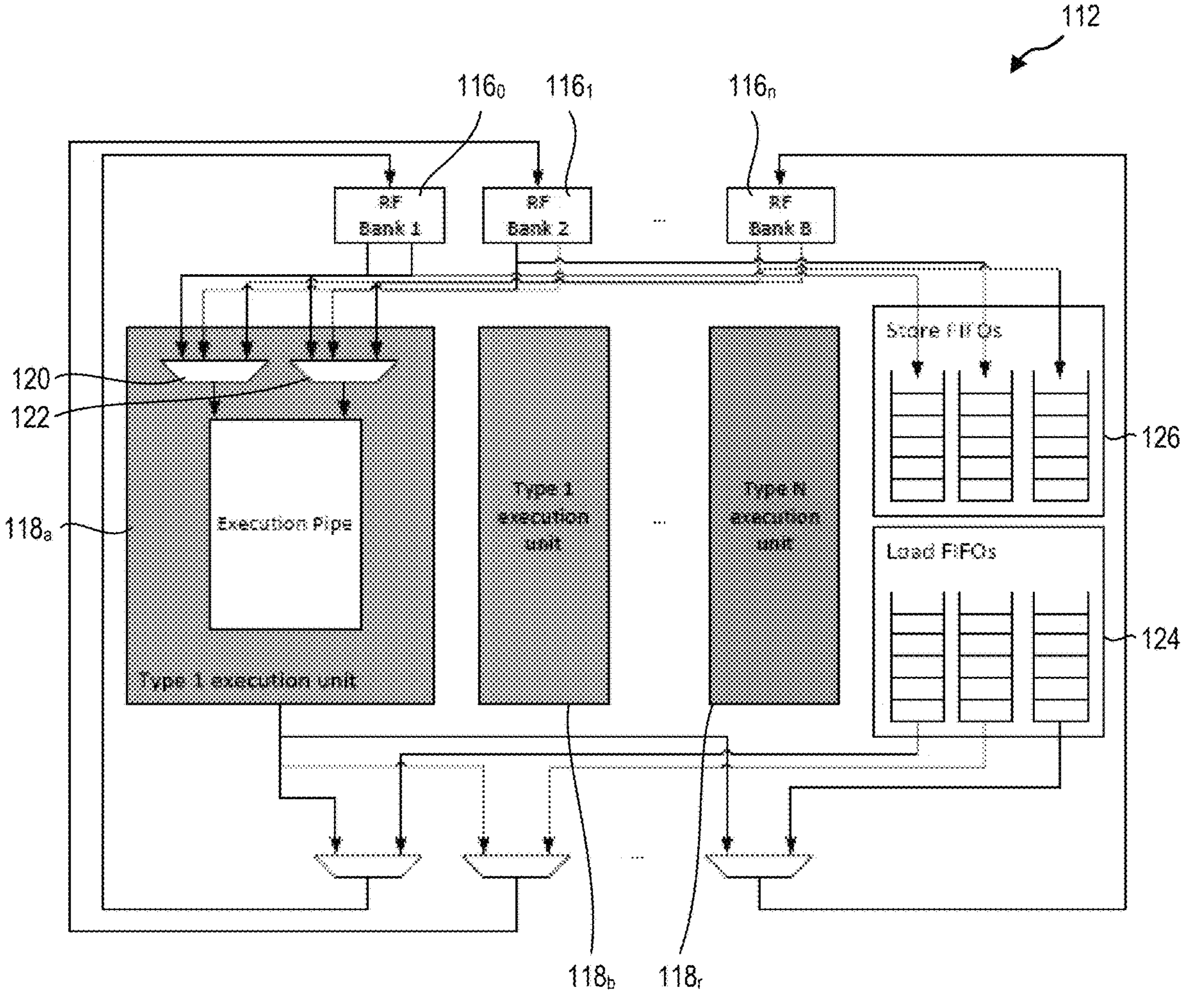
FIG. 3 illustrates an example vector processor lane in accordance with implementations of the present disclosure.

Referring now to FIG. 3, illustrated is an example vector processor lane 112 for use with a vector processor 102 (FIGS. 1 and 2). Each vector processor lane 112 includes a plurality of execution units 118 (e.g., execution units $\mathbf{118}_a$, $\mathbf{118}_b$ up to $\mathbf{118}_r$) and a plurality of register file banks 116 (e.g., register file bank $\mathbf{116}_0$, $\mathbf{116}_1$ up to $\mathbf{116}_N$). In some implementations, each register file bank 116 holds one or more thirty-two bit elements of a vector register. In some implementations, the plurality of register file banks 116 feeds multiple hardware execution units 118 simultaneously.

Each hardware execution unit 118 reads from and writes to every register file bank 116 in in a sequential order, which creates multiple virtual register file read and write ports. While the register file banks 116 must be read from in order or written to in order, the order of the execution units 118 reading from a register file bank 116 or writing to a register file bank 116 is determined by the instruction stream and availability of the execution units 118. The execution units 118 are heterogenous and capable of executing only a subset of vector instructions each. In some implementations, the execution units 118 perform different operations (e.g., one execution unit 118 performs addition, while a different execution unit 118 performs multiplication). Multiple instances of the same execution unit 118 may be provided for common instructions. For example, a subset of the execution units 118 perform a same operation (e.g., two execution units 118 perform addition and two different execution units 118 perform multiplication) while other execution units 118 perform a different operation (e.g., another execution unit 118 performs logarithm operations and another execution unit 118 performs square root).

Each hardware execution unit 118 has a first mux 120 that selects which register file bank 116 to read from at any time. The mux 120 multiplexes data from all the register file banks 116 into an execution pipe. The execution pipe is a simple feed-forward unit. In some implementations, the output of the execution pipe is buffered in an optional padding delay (which is used to ensure that all execution units 118 have the same execution latency), before providing the output of the execution unit 118. Each hardware execution unit 118 has a second mux 122 (only for binary operations) that also selects between the register file banks 116 and has an additional input that can hold a scalar value. For example, the second mux 122 includes a flip-flop that holds a constant value from the control unit for vector-scalar and vector-constant operations. The two muxes in the execution units 118 have independent signals that are controlled by the execution unit 118. The move execution unit 118, however, has only one mux that selects between the register file banks 116 and the one mux of the move execution unit 118 includes an additional input field that can hold a scalar value.

Each register file bank 116 also has a mux on its write port that selects which hardware execution unit 118 may write to that register file bank 116 in any cycle. The vector controller 110 (FIG. 1) ensures that the read and write mux select signals for each hardware execution unit 118 and each register file bank 116 are set correctly and in synchronization with each other. The vector controller 110 ensures that instructions are issued only once all dependencies have been resolved, and that issued instructions cannot stall the datapath.

In some implementations, each register file bank 116 is thirty-two bits wide with two read ports and one write port. Each register file bank 116 holds E thirty-two bit values from the vector register (where E is a positive integer). Control logic for the read mux 120 ensures that the mux 120 cycles through all register file banks 116 starting at register file bank $\mathbf{116}_0$ and ending at register file bank $\mathbf{116}_N$, switching register file banks 116 every E cycles, as the read address supplied to the register file bank 116 reads through the E source values in the register file bank 116. Write mux select signals are controlled via a shift-register that shifts the select signals to the next mux every E cycles, ensuring that the same execution unit 118 may write to all N register file banks 116.

Also connected to the read ports of each register file bank 116 are E thirty-two bit wide dual-clock FIFOs used to store values from the vector register file to the on-chip shared memory. Each vector processor lane 112 also includes a load unit 124 and a store unit 126. In some implementations, the load unit 124 and the store unit 126 connect to an on-chip 4096-bit wide shared memory. Each register file bank 116 is thirty-two bits wide (e.g., each register file bank 116 may read or write two bfloat16 values or a single single-precision value from or to a vector register in a single clock cycle). In some implementations, the load unit 124 in each lane includes a plurality of first in first outs (FIFOs) queues equal to a number (e.g., E*N) of register file banks 116 and each register file bank 116 is associated with a FIFO queue. For example, the plurality of FIFOs queues are dual-clock thirty-two bit wide. In some implementations, the store unit 126 includes a plurality of FIFOs queues equal to a number (e.g., E*N) of register file banks 116. In some implementations, the plurality of FIFOs queues in the load unit 124 and the store unit 126 is equal to a number (N).

Loading a vector involves writing the vector values from the on-chip shared memory into each of the load unit 124 FIFO queues in each vector processor lane 112. Once the data is in the load unit 124 FIFO queues, each vector processor lane 112 cycles through each register file bank 116, and each of the load unit 124 FIFO queues connected to that register file bank 116, draining values from the FIFO queues and loading the values into the register file bank 116.

To store data back to the scratchpad SRAM, each vector processor lane 112 cycles through the register file banks 116 of the vector processor lane 112 reading the portion of vector elements stored in the register file banks 116. Selective write enables the store unit 126 FIFO queues to ensure that the appropriate data is written into each FIFO queue of the store unit 126. By supplying write-enabled signals at the correct time, data may be steered to the appropriate FIFO queue. Back-to-back load or store instructions may be serviced without any delay because once data for a load or store are written to or read from a FIFO, there is no other data from the same load or store in the same FIFO and the vector processor 102 does not have to wait for a load or store instruction to complete. The parameters of the vector processor may be changed independently of the on-chip shared memory parameters as the width of each load/store FIFO multiplied by the number of such FIFOs (E*N) is a constant.

Once all FIFO queues have been written in the store unit 126, the scratchpad memory may drain the data out of the store unit 126 FIFO queues and write into memory. For both loads and stores, once a register file bank 116 within a vector processor lane 112 is finished reading from or writing to its set of FIFO queues in the load unit 124 and/or the store unit 126, the register file bank 116 is ready to read a new set of values from the same FIFO queues in the load unit 124 or write a new set of values to the same FIFO queues in the store unit 126. Therefore, the vector processor lane 112 is able to service back-to-back loads and stores without any stalls, as long as the on-chip scratchpad can service these requests at the same rate.

The number of register file banks 116 (e.g., N) and/or a number of execution units 118 (e.g., r) in a vector processor lane 112 are configurable and can change. For example, for a fixed vector length defined in the processor's ISA, the number of vector processor lanes 112 multiplied by a number of the register file banks 116 per vector processor lane 112 and the number of vector elements per register file bank 116 must equal the vector length. Another example includes changing the number of hardware execution units 118 for each type of operation. For example, resource utilization and the expected performance of a given vector processor lane configuration may be used in determining a number of hardware execution units 118 to use in each vector processor lane 112 for each type of operation to provide a performance level for the least resources used (e.g., a number of execution units 118 used).

In some implementations, some execution units 118 are unused for some operations. For example, if a combined hardware execution unit 118 for inverse, square root, exponent, and logarithm operations is provided in the vector processor 102, the combined hardware execution unit 118 is used frequently in SoftMax operations, which requires exponents calculated for each value, but is rarely used in layer normalization operations, where inverse and square roots are calculated after significant data aggregation.

In some implementations, the vector processor 102 includes a configuration of eight (nominally thirty-two bit) vector processor lanes 112 with eight vector register file banks 116 with two thirty-two bit vector elements stored per vector register file bank 116 coupled with seven execution units 118 (three bfloat16 multiply/add execution units 118, one single-precision add execution unit 118, one execution unit 118 for approximate bfloat16 transcendental functions, one execution unit 118 for dropout/compare operations, and one execution unit 118 for move/convert operations) yields an optimal performance-FPGA resources tradeoff for the performance requirements and resource constraints on the hardware component 104. In some implementations, the vector processor 102 includes a configuration of sixteen vector processor lanes 112 with eight vector register file banks 116 per lane and one thirty-two bit vector element per register file bank 116.

In some implementations, the vector processor 102 includes a configuration of four vector processor lanes 112 configuration, which can issue a thirty-two cycle instruction every four cycles, trading temporal and spatial SIMD. For example, the 4096-bit vector is divided among the four vector processor lanes 112 such that the lowest 1024 bits (e.g., 32*E*L, where L is a positive integer) are assigned to a first vector processor lane 112 (e.g., the vector processor lane $\mathbf{112}_0$), the next 1024 bits (e.g., 32*E*L) are assigned to a second vector processor lane 112 (e.g., the vector processor lane $\mathbf{112}_1$), and so on.

By dividing the input data across the vector processor lanes 112, each vector processor lane 112 may be placed next to the on-chip shared memory that holds the corresponding data elements being loaded or stored by the vector processor 102. In some implementations, the on-chip shared memory is 4096-bit wide to match the width of the high-bandwidth memory (HBM) system on the FPGA. In some implementations, a small network is placed between the vector processor lanes 112 to move data across lanes, which is required for supporting some variants of move and convert operations in the vector. As the data order is rearranged in a vector, memories are used to store temporary copies of data which are then read out in the correct order required by the register file banks 116, allowing move and convert operations to have a predictable latency and respect the sequential read and write order both within a register file bank and across register file banks, which can be used by the vector controller 110 (FIG. 1) to schedule instructions correctly.

Figure 4:
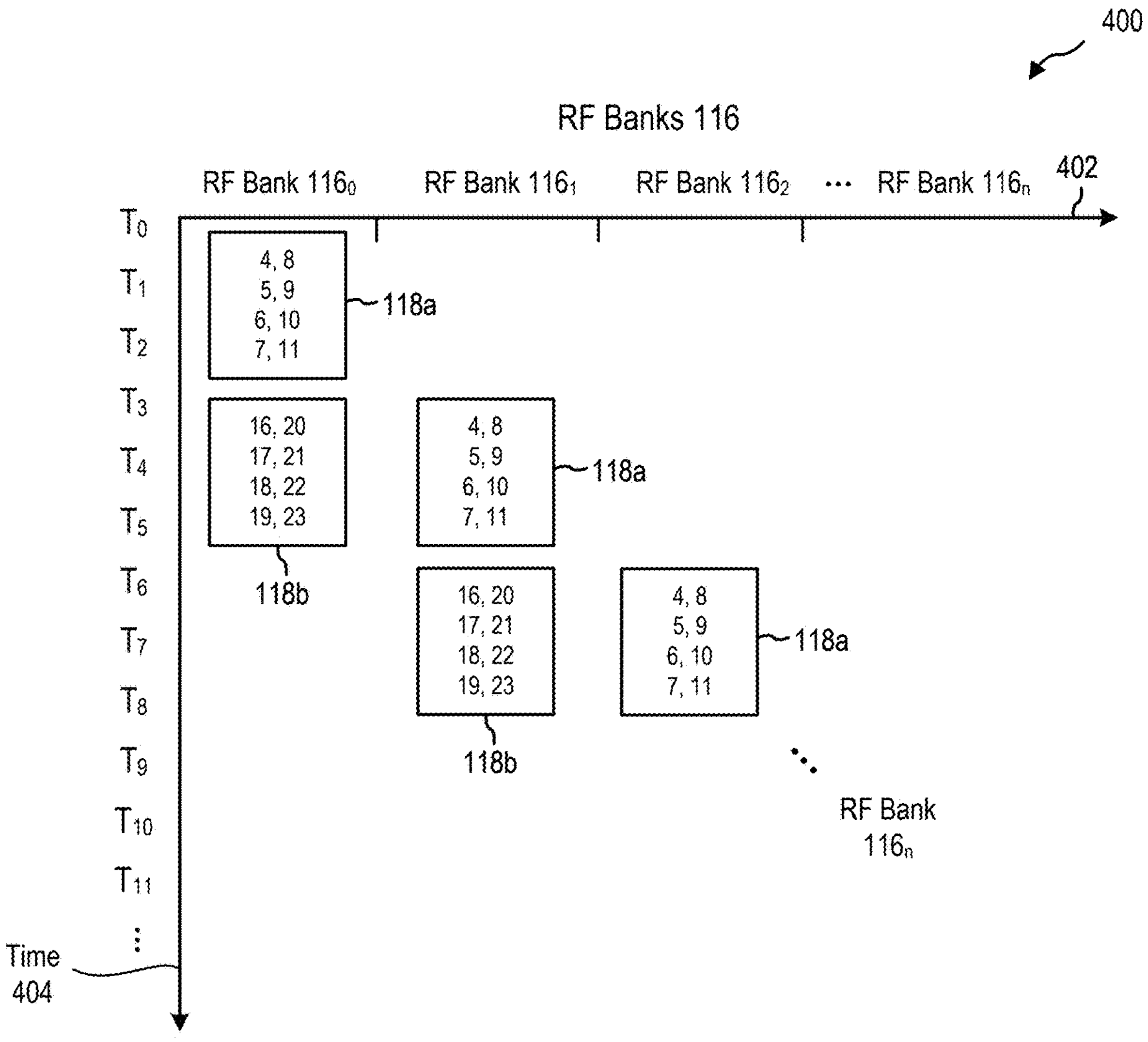
FIG. 4 illustrates an example timing diagram for register file reads performed by a vector processor in accordance with implementations of the present disclosure.

Referring now to FIG. 4, illustrated is an example timing diagram 400 for register file reads performed by two execution units 118 (FIGS. 2 and 3) (e.g., a first execution unit $\mathbf{118}_a$ and a second execution unit $\mathbf{118}_b$) in a vector processor 102 (FIGS. 1-3). In the illustrated example, there are four vector processor lanes 112 in the vector processor 102 with eight register file banks 116 (e.g., N equals 8) where each register file bank 116 includes 128 bits of the vector data, where a lowest 128 bits of the vector data in a vector processor lane 112 is in register file bank 0 and the remaining bits are placed in sequence into the remaining register file banks 116 in blocks of 128 bits. The first execution unit 118$_a$ performs an addition operation with a destination register ($r_0$) and source destinations ($r_1$ and $r_2$) and the second execution unit 118$_b$ performs a multiplication operation with a destination register $r_3$ and source destinations ($r_4$ and $r_5$).

The x-axis 402 of the timing diagram 400 illustrates the different register file banks 116 (e.g., register file bank 116$_0$, 116$_1$, 116$_2$ up to 116$_N$) and the y-axis 404 of the timing diagram 400 illustrates different times (e.g., $T_0$, $T_1$, $T_2$ . . . ) corresponding to different clock cycles. At time $T_0$, the first execution unit 118$_a$ performs a read of the first register file bank 116$_0$ to perform the addition operation on the data stored in the first register file bank 116$_0$. The first execution unit 118$_a$ reads from the first register file bank 116$_0$ at positions 4, 8 on a first cycle, reads from positions 5, 9 at a second cycle (e.g., time $T_1$), reads from positions 6, 10 on a third cycle (e.g., time $T_2$), and reads from positions 7, 11 at a fourth cycle (e.g., time $T_3$).

At time $T_4$, the first execution unit 118$_a$ is finished with the first register file bank 116$_0$ and starts reading at a next register file bank 116 in the sequence (e.g., the register file bank 116$_1$). The first execution unit 118$_a$ reads from the second file bank 116$_1$ at positions 4, 8 on a first cycle (e.g., time $T_4$). At the same time $T_4$, the second execution unit 118$_b$ starts reading from the first register file bank 116$_0$ to perform the multiplication operation on the data stored in the first register file bank 116$_0$. While the register file banks 116 must be read from in order, the order of the execution units 118 reading from a register file bank 116 is determined by the instruction stream and the availability of the execution units 118. The illustrated example shows the second execution unit 118$_b$ reading from the first register file bank 116$_0$ next, however, another execution unit (e.g., execution unit 118$_c$) may have read from the register file bank 116$_0$ after the execution unit 118$_a$ if the other execution unit was available instead of the second execution unit 118$_b$, or if the instruction stream indicated the other execution unit (e.g., execution unit 118$_c$) for reading the register file bank 116$_0$ next. At time $T_5$, the first execution unit 118$_a$ reads from positions 5, 9 of the second register file bank 116$_1$ and the second execution unit 118 reads from positions 17, 21 of the first register file bank 116$_0$. At time $T_6$, the first execution unit 118$_a$ reads from positions 6, 10 of the second register file bank 116$_1$ and the second execution unit 118$_b$ reads from positions 18, 22 of the first register file bank 116$_0$. At time $T_7$, the first execution unit 118$_a$ reads from positions 7, 11 of the first register file bank 116$_1$ and the second execution unit 118$_b$ reads from positions 19, 23 of the first register file bank 116$_0$.

At time $T_8$, the first execution unit 118$_a$ is finished with the second register file bank 116$_1$, and the second execution unit 118$_b$ is finished with the first register file bank 116$_0$. The first execution unit 118$_a$ starts reading from the third register file bank 116$_2$ and the second execution unit 118$_b$ starts reading from the second register file bank 116$_1$. The process continues until each execution unit (e.g., the first execution unit 118$_a$ and the second execution unit 118$_b$) reads from all of the register file banks 116 in the vector processor lane 112 in a sequential order.

The vector processor 102 uses temporal SIMD to time-multiplex the register file banks 116 in the vector processor 102 to keep multiple hardware execution units 118 busy in the vector processor 102.

Figure 5:
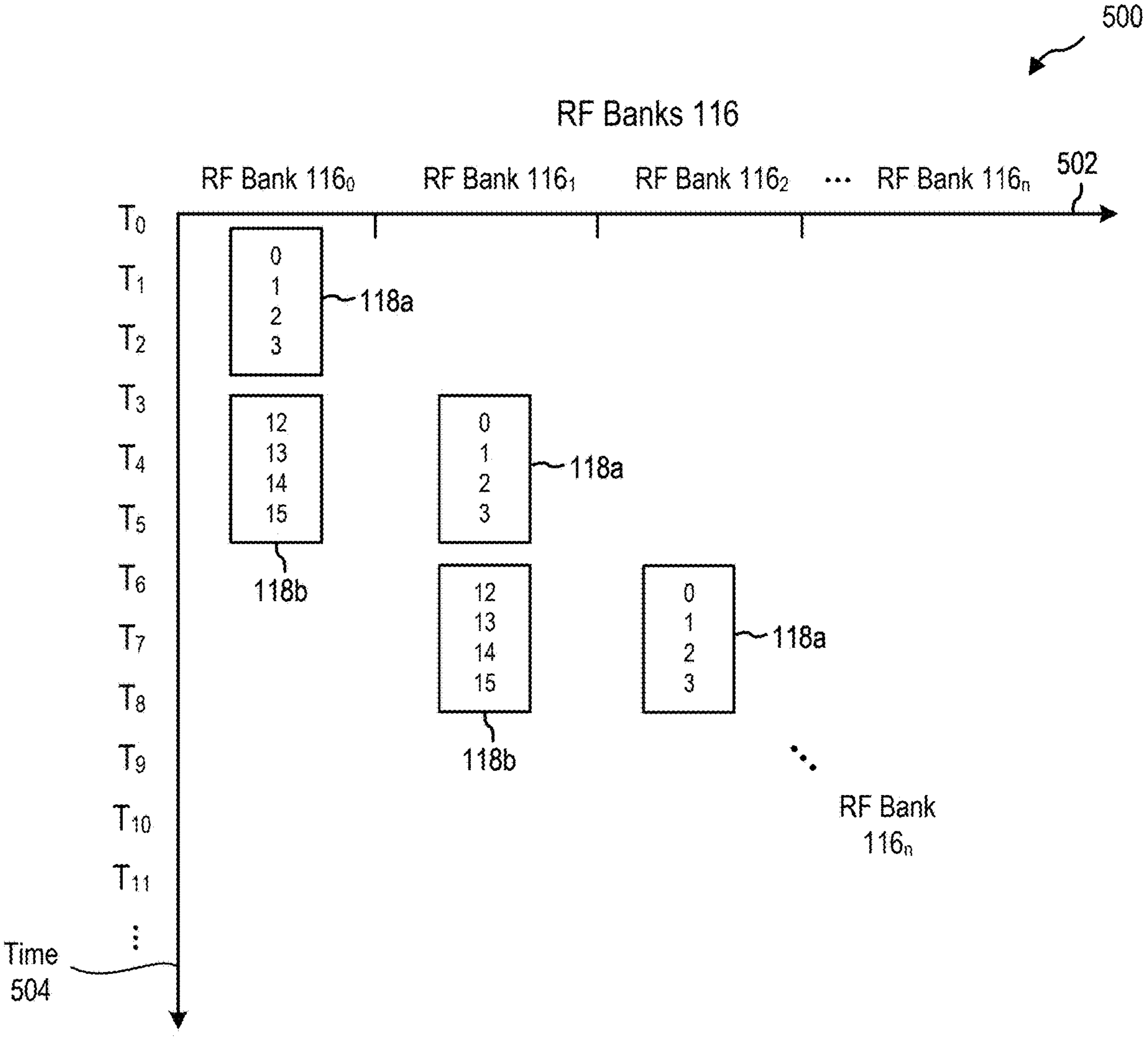
FIG. 5 illustrates an example timing diagram of a writes to a bank of register files performed by a vector processor in accordance with implementations of the present disclosure.

Referring now to FIG. 5, illustrated is an example timing diagram 500 of example writes to register file banks 116 performed by two execution units 118 (FIGS. 2 and 3) (e.g., a first execution unit 118$_a$ and a second execution unit 118$_b$) in a vector processor 102 (FIGS. 1-3). In the illustrated example, E=4 (there are four vector elements in each register file bank 116). The example illustrated in FIG. 5 corresponds to the example illustrated in FIG. 4. In some implementations, the times illustrated on the y-axis 504 in FIG. 5 occur as a continuation of the timing diagram 400 illustrated in FIG. 4.

The x-axis 502 of the timing diagram 500 illustrates the different register file banks 116 (e.g., register file bank 116$_0$, 116$_1$, 116$_2$ up to 116$_N$) and the y-axis 504 of the timing diagram 500 illustrates different times (e.g., $T_0$, $T_1$, $T_2$ . . . ) corresponding to different clock cycles. At time $T_0$, the first execution unit 118$_a$ writes to the first register file bank 116$_0$. For example, a first instruction is issued and the first execution unit execution unit 118$_a$ writes to the first register file bank 116$_0$ at position 0 in response to the first instruction issuing. The first execution unit 118$_a$ writes to the first register file bank 116$_0$ at position 0 on a first cycle (e.g., time $T_0$), writes to position 1 at a second cycle (e.g., time $T_1$), writes to position 2 on a third cycle (e.g., time $T_2$), and writes to position 3 at a fourth cycle (e.g., time $T_3$).

At time $T_4$, the first execution unit 118$_a$ is finished with the first register file bank 116$_0$ and starts writing at a next register file bank 116 in the sequence (e.g., the register file bank 116$_1$). The first execution unit 118$_a$ writes to the second file bank 116$_1$ at position 0 on a first cycle (e.g., time $T_4$). At the same time $T_4$, the second execution unit 118$_b$ starts writing to the first register file bank 116$_0$ at position 12. For example, a second instruction is issued and the second execution unit 118$_b$ starts writing to the first register file bank 116$_0$ at position 12 in response to the second instruction issuing. While the register file banks 116 must be written to in order, the order of the execution units 118 writing to a register file bank 116 is determined by the instruction stream and the availability of the execution units 118. The illustrated example shows the first execution unit 118$_a$ writing first to the first register file bank 116$_0$ and the second execution unit 118$_b$ writing to the first register file bank 116$_0$ next. However, another execution unit (e.g., execution unit 118$_d$) may have written to the register file bank 116$_0$ first, or after the execution unit 118$_a$, if the other execution unit was available instead of the first execution unit 118$_a$ or the second execution unit 118$_b$, or if the instruction stream indicated the other execution unit (e.g., execution unit 118$_d$) for writing to the register file bank 116$_0$. At time $T_5$, the first execution unit 118$_a$ writes to position 1 of the second register file bank 116$_1$ and the second execution unit 118$_b$ writes to position 13 of the first register file bank 116$_0$. At time $T_6$, the first execution unit 118$_a$ writes to position 2 of the second register file bank 116$_1$ and the second execution unit 118$_b$ writes to position 14 of the first register file bank 116$_0$. At time $T_7$, the first execution unit 118$_a$ writes to position 3 of the first register file bank 116$_1$ and the second execution unit 118$_b$ writes to position 15 of the first register file bank 116$_0$.

At time $T_8$, the first execution unit 118$_a$ is finished with the second register file bank 116$_1$, and the second execution unit 118$_b$ is finished with the first register file bank 116$_0$. The first execution unit 118$_a$ starts writing to the third register file bank 116$_2$ and the second execution unit 118$_b$ starts writing to the second register file bank 116$_1$. The process continues until the first execution unit 118$_a$ and the second execution unit 118$_b$ writes to all of the register file banks 116 in the vector processor lane 112 in a sequential order and the instruction stream is processed by the plurality of execution units 118.

The vector processor 102 uses temporal SIMD to time-multiplex the register file banks 116 in the vector processor 102 to keep multiple hardware execution units 118 busy in the vector processor 102.

Figure 6:
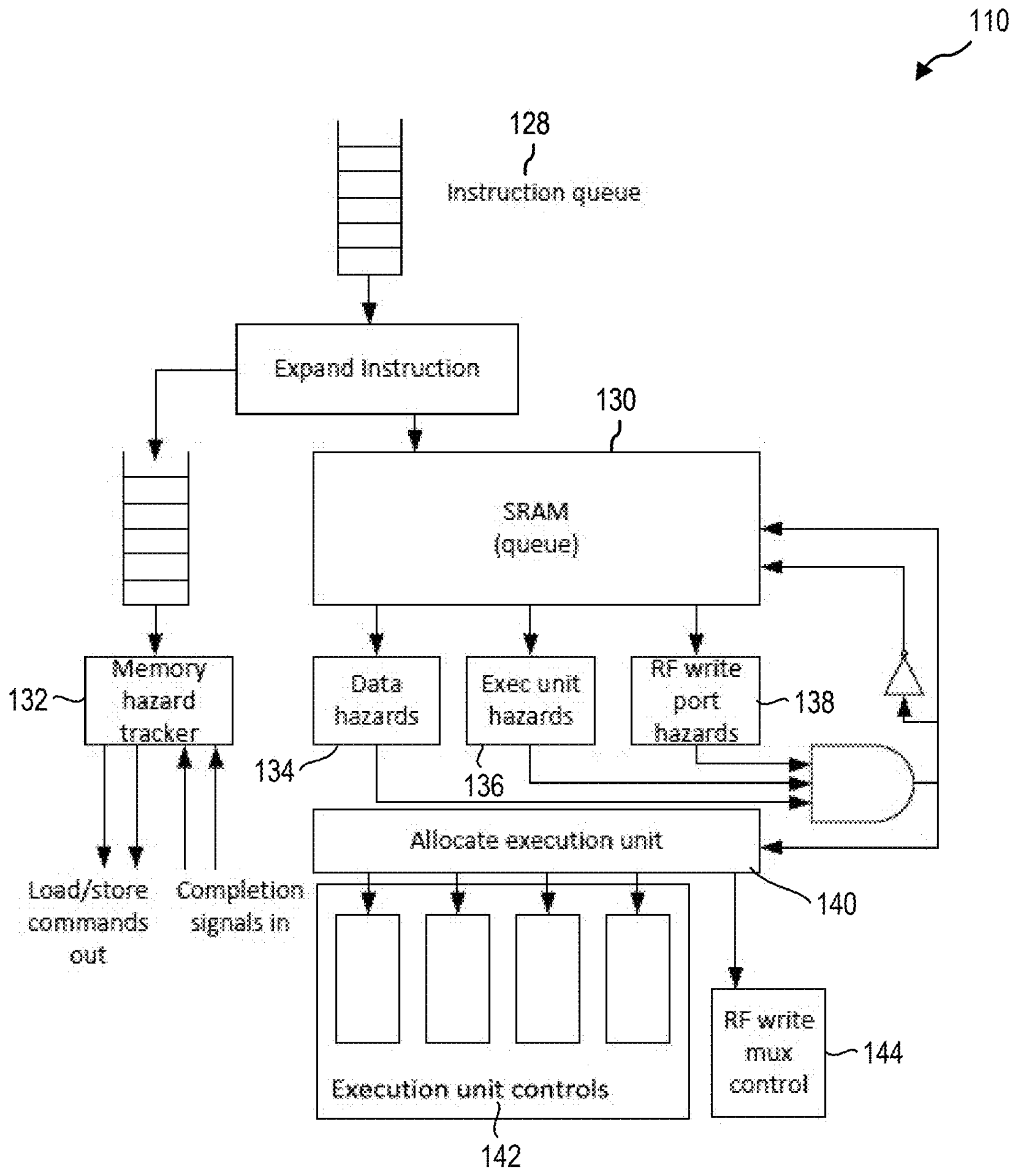
FIG. 6 illustrates an example vector controller in accordance with implementations of the present disclosure.

Referring now to FIG. 6, illustrated is an example architecture for the vector controller 110. The vector controller 110 identifies memory hazards and issues memory read and write commands as early as possible for loads and stores. The vector controller 110 also detects and avoids register file data hazards (e.g., read-after-write or write-after-write). The vector controller 110 also tracks hardware execution unit 118 and register file write port availability to detect and avoid structural hazards. In some implementations, the vector controller 110 issues instructions as fast as the datapath can consume the instructions, preventing bubbles and stalls in issuing the instructions.

The vector controller 110 includes an instruction queue 128 that buffers up non-speculative instructions issued by the scalar unit 106 (FIGS. 1 and 2). The instructions are expanded into a wider format. The instructions are forwarded to an instruction queue 130 stored in an SRAM. Memory instructions (loads, stores, fences) are also forwarded to a memory instruction queue, which feeds the memory hazard tracker 132 responsible for tracking memory hazards, issuing load and store commands to the on-chip shared memory, and receiving completion responses from the scratchpad.

The instructions in the instruction queue 130 are read speculatively into the three hazard trackers: a register file data hazard tracker 134, an execution unit structural hazard tracker 136, and a register file write port structural hazard tracker 138. The hazard trackers are padded to have the same latency. If all three hazard trackers agree that no hazard exists, then the instruction queue's head pointer is incremented. If any of the hazard trackers indicates that a hazard exists, then the read pointer is reset to the value of the head pointer, resetting the issue logic to the last instruction not successfully issued. Simultaneously, the speculative instructions in the hazard tracker pipelines are squashed.

If no hazards exist, then the instruction proceeds through the vector control unit pipeline to a hardware execution unit allocator 140, which allocates a physical hardware execution unit 118 (FIGS. 2 and 3) capable of processing that instruction in a round-robin fashion. The instruction continues down the vector control unit to the corresponding hardware execution unit control unit 142, which generates cycle-by-cycle control signals for the hardware execution unit's 118 datapath.

Simultaneously, the instruction is also sent to the register file write mux control unit 144, which accounts for the latency of the hardware execution pipeline and reserves the write mux for the corresponding hardware execution pipeline, which ensures that the data produced by this execution unit 118 are written to the vector register file 114 (FIG. 2) at the appropriate clock cycles. Note that no structural hazards exist on the register file write ports at this point, since these have already been resolved by the register file write port structural hazard tracker. Once an instruction has been issued to an execution unit 118, no further control feedback is required and each execution unit 118 proceeds with a predictable, fixed latency.

The vector controller 110 holds within it a view of the future state of the vector datapath which ensures that the vector datapath must never stall or back-pressure. Control signals from the various execution control units 142 are forwarded to the individual vector processor lanes 112 (FIGS. 2 and 3) of the vector datapath via a deeply pipelined fanout tree. This structure is purely feed-forward and allows individual vector processor lanes 112 to be placed far apart in the final FPGA placement without incurring long routing delays that could limit the clock frequency, which minimizes the vector processor's 102 impact on the overall physical efficiency of the placed and routed system. Further, the vector processor lanes 112 may be freely placed with spatial locality to the segment of the 4096-bit wide on-chip shared memory (which is physically distributed across a large region of the device), to which that vector processor lane 112 reads and writes. Finally, vector processor lanes 112 may be placed in physical regions most amenable to the system's global floorplan.

The register file data hazard tracker 134 detects and avoids read-after-write and write-after-write hazards. Each instruction may have up to two source operands and one destination operand. The register file data hazard tracker 134 assigns a valid bit to each register which is reset whenever an instruction writing to that register is issued and set once the instruction is complete.

If the other two hazard trackers (the execution unit structural hazard tracker 1365 and the register file write port structural hazard tracker 138) agree that the instruction may be issued, the register file hazard tracker 134 clears the valid state of the destination register. The valid state of the destination register is once again set when the instruction is scheduled to begin writing to the register file, allowing subsequent dependent instructions to be issued.

As the valid state is read only at the start of the register file hazard tracker 134 pipeline and updated at the end of the pipeline, this method cannot track true data hazards that exist across an N-instruction window, where N is the number of instructions that may be in flight in the hazard tracker pipeline. The register file data hazard tracker 134 also checks each instruction with the N preceding instructions to verify that no true data hazards exist; this information is added in the AND-reduction performed on the valid states obtained from the state table to complete the process of checking all data hazards.

The hardware execution unit structural hazard tracker 136 counts the number of available hardware execution units 118 of each type (e.g., available hardware execution units 118 to perform an operation). When an instruction is issued, it decrements the count of the corresponding execution unit type, if the count reaches zero, no instruction requiring a hardware execution unit 118 of that given type may be issued. In some implementations, the latency of the logic in the execution unit structural hazard tracker 136 is accounted for by creating two sets of counters. The first counter holds a speculative count of available execution units 118 and is read and decremented when an instruction reaches the head of the hazard tracker pipeline. The second set of counters holds the real number of available execution units 118, and this count is decremented only if all three hazard trackers agree that an instruction may be issued. If it is determined that an instruction may not be issued, the values of the speculative counters are reset to the values of the real counters. When an instruction is anticipated to complete and free up an execution unit 118, the corresponding speculative and real availability counters are incremented appropriately, allowing future instructions using these hardware execution units 118 to be issued.

The register file write port structural hazard tracker 138 uses a shift register to store the reserved status of the register file write port. This shift register stores not only whether the write port is reserved, but also the ID of the register which must be written. This information is used to control the register file write address and to set as valid the register state in the register file data hazard tracker. Taps into this shift register are used to read and write the reservation for write ports. The read taps are used by the head of the hazard tracker pipeline to query if the register file write port is reserved for the clock cycle in the future corresponding to the latency of the hardware execution unit 118 responsible for handling the current instruction. The write taps are used to reserve the write port when all three hazard trackers determine that the instruction may be successfully issued.

As instructions read the status of the write port a few cycles before the state is updated, a prior instruction may reserve the write port for the same cycle after the state has been checked. The vector controller 110 disallows the difference in the latencies of any pair of hardware execution units 118 to be less than the latency of the register file write port hazard tracker 138 to prevent a prior instruction may reserve the write port for the same cycle after the state has been checked and ensuring that a read tap for a given type of hardware execution unit 118 is followed by the write tap for the same hardware execution unit 118, without any other intervening read or write taps for any other execution unit 118 type.

In some implementations, the memory hazard tracker 132 uses a memory table to store bits indicating pending loads and pending stores to each possible memory address. If a load detects that a prior store may not have completed writing its data to a given memory address, the load operation stalls until the hazard is resolved, and vice versa for stores. The on-chip shared memory provides the memory hazard tracking unit with an early confirmation of data being read from or written to the scratchpad memory banks, allowing hazards to be resolved a few cycles early. Once the load operation is complete, data is written into the load unit 124 (FIG. 3) FIFO queues in the vector datapath, and the counters in the execution unit structural hazard tracker 136 for loads are incremented to indicate that the data is ready. Similarly, once data are read out of the store unit 126 (FIG. 3) FIFO queues, the counters corresponding to store units are incremented. The memory hazard tracker 132 may use multiple cycles to track a single hazard without sacrificing performance.

The memory hazard tracker 132 is responsible for tracking memory hazards and issuing load and store commands. When the load commands complete and data is placed in the load unit 124 FIFO queues, the corresponding load instruction may be issued by the execution unit structural hazard tracker 136. This allows the datapath and its associated control to be decoupled with the commands sent to the memory system, hiding the latency of the memory system.

Figure 7:
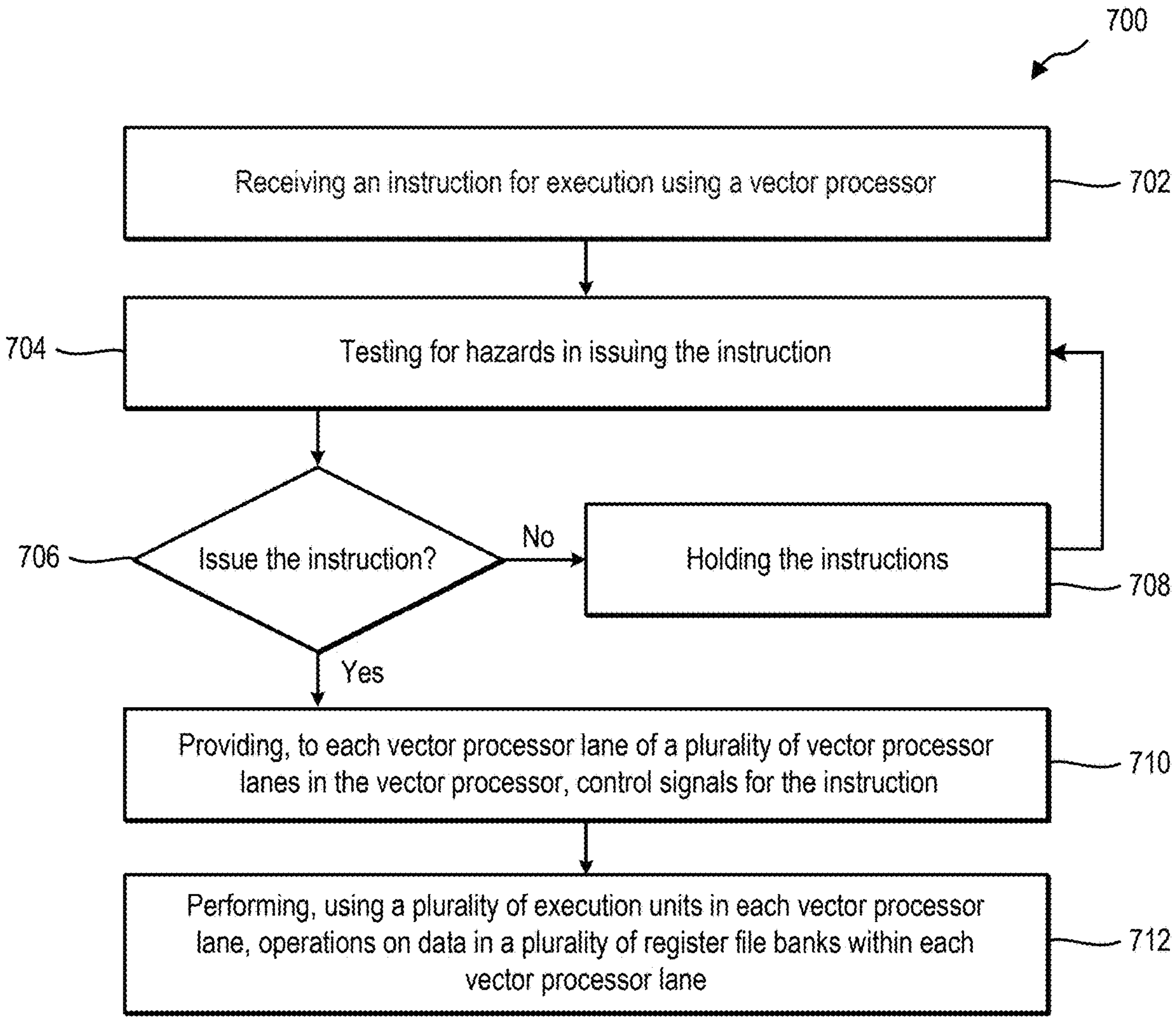
FIG. 7 illustrates an example method performed by a vector processor in accordance with implementations of the present disclosure.

Referring now to FIG. 7, illustrated is an example method 700 performed by a vector processor 102 (FIGS. 1-6). The actions of the method 700 are discussed below with reference to FIGS. 1-6.

In some implementations, the method 700 is performed by a vector processor 102 that includes a vector controller 110 configured to receive instructions for execution on the vector processor 102 and provide control signals to a plurality of vector processor lanes 112; and a plurality of vector processor lanes 112 where each vector processor lane of the plurality of vector processor lanes 112 includes: a vector register file 114 with a plurality of register file banks 116 to store data; a load unit 124 with a plurality of first in first out queues that loads the data into the plurality of register file banks 116; a plurality of execution units 118 configured to perform operations on the data in each of the plurality of register file banks 116 and execute the instructions from the instruction issue queue; and a store unit 126 with a plurality of first in first out queues that reads the data from each of the plurality of register file banks 116.

In some implementations, the programmable hardware component 104 is a field programmable gate array (FPGA) device and the processor is a vector processor 102 implemented as an overlay on the FPGA device.

In some implementations, a number of vector processor lanes 112 is selected in response to performance requirements of the programmable hardware component 104 and available space on the programmable hardware component 104.

In some implementations, the method 700 is performed by a vector processor lane 112 of the vector processor 102. In some implementations, each vector processor lane of the plurality of vector processor lanes 112 receives a subset of the data and each vector processor lane performs a same operation on the subset of the data in parallel.

At 702, the method 700 includes receiving an instruction for execution using a vector processor. For example, the vector controller 110 receives an instruction for execution using the vector processor 102. In some implementations, the vector controller 110 receives the instruction from a scalar unit 106.

At 704, the method 700 includes testing for hazards in issuing the instructions. The vector controller 110 tests for hazards in issuing the instruction. In some implementations, the hazards include data hazards. In some implementations, the hazards include structural hazards. In some implementations, the hazards include memory hazards. In some implementations, the hazards include any combination of data hazards, structural hazards, or memory hazards.

At 706, the method includes determining whether to issue the instruction. The vector controller 110 determines whether to issue the instruction in response to the testing for hazards.

At 708, the method includes holding the instruction in response to determining not to issue the instruction. In some implementations, the vector controller 110 holds the instruction, preventing the instruction from issuing, in response to identifying one or more hazards during the testing for hazards. The method 700 may return to 704 to continue to test for hazards and the vector controller 110 may continue to hold the instruction until the hazards are resolved.

At 710, the method 700 includes providing, to each vector processor lane of a plurality of vector processor lanes in the vector processor, control signals for the instruction in response to determining to issue the instruction. The vector controller 110 provides control signals for the instructions to each vector processor lane 112 in the vector processor 102 in response to determining to issue the instruction. Each vector processor lane 112 performs operations on a subset of the data in parallel. In some implementations, each vector processor lane 112 operates in lockstep performing the operations.

At 712, the method 700 includes performing, using a plurality of execution units in each vector processor lane, operations on data in a plurality of register file banks within each vector processor lane. In some implementations, the plurality of execution units 118 read the data from the plurality of register file banks 116 in a sequential order starting with a first register file bank and writes the data to the plurality of register file banks 116 in the sequential order starting with the first register file bank until the data is read from each of the plurality of register file banks 116 or written to each of the plurality of register file banks 116. In some implementations, the control signals and an availability of the plurality of execution units 118 determines an order for each execution unit of the plurality of execution units 118 to read from the plurality of register file banks 116. In some implementations, each execution unit 118 includes a multiplexer 120 to select a register file bank of the plurality of register file banks 116 to read the data from during a cycle (e.g., time $T_0$, time $T_1$, etc.).

In some implementations, one execution unit of the plurality of execution units 118 at a time reads a portion of data in each register file bank in sequential order of the plurality of register file banks 116 for a fixed number of cycles and the execution unit performs an operation on the portion of data in each register file bank during the fixed number of cycles until the data is read from each of the plurality of register file banks 116.

In some implementations, each register file bank of the plurality of register file banks 116 includes the portion of the data provided by the plurality of first in first out queues of the load unit 124 and each register file bank stores the portion of the data in sequential order. In some implementations, a number of the plurality of first in first out queues of the load unit 124 equals a number of the plurality of register file banks 116 and each register file bank 116 is associated with a single first in first out queue of the load unit 124.

In some implementations, one execution unit of the plurality of execution units 118 at a time reads a portion of data in each register file bank in sequential order of the plurality of register file banks 116 for a fixed number of cycles and performing an operation on the portion of data in each register file bank during the fixed number of cycles until the data is read from each of the plurality of register file banks 116.

In some implementations, each execution unit 118 performs different operations (e.g., addition, multiplication, logarithm operations, square root) on the data. In some implementations, a subset of execution units 118 perform a same operation on the data. In some implementations, a subset of execution units 118 perform a same operation on the data while other execution units 118 perform different operations on the data.

In some implementations, a number of plurality of register file banks 116 is selected in response to a length of a vector and a size of each register file bank is determined using the number of plurality of register file banks 116 and the length of the vector. In some implementations, a number of the plurality of execution units 118 is different from a number of the plurality of register file banks 116. In some implementations, a number of the plurality of execution units 118 is equal to a number of the plurality of register file banks 116. In some implementations, a number of execution units 118 is selected in response to types of operations needed for the instructions.

In some implementations, each register file bank 116 writes the data to a first in first out queue of the store unit 126 associated with the register file bank 116. In some implementations, a number of the plurality of first in first out queues of the store unit 126 equals a number of the plurality of register file banks 116 and each register file bank 116 is associated with a single first in first out queue of the store unit 126.

In some implementations, the method 700 further includes writing, into memory, the data from the plurality of first in first out queues of the store unit 126.

One example use case of the method 700 includes reading, by a first execution unit (e.g., execution unit $\mathbf{118}_a$) of the plurality of execution units 118, a first portion of data from a first register file bank (e.g., register file bank $\mathbf{116}_0$) of the plurality of register file banks 116 during a first cycle (e.g., time $T_0$) and performing the operation on the first portion of data; reading, by the first execution unit (e.g., execution unit $\mathbf{118}_a$), a second portion of data from a second register file bank (e.g., register file bank $\mathbf{116}_1$) of the plurality of register file banks 116 during a second cycle (e.g., time $T_4$) and performing the operation on the second portion of data; and reading, by a subsequent execution unit (e.g., execution unit $\mathbf{118}_b$), the first portion of data from the first register file (e.g., register file bank $\mathbf{116}_0$) bank during the second cycle (e.g., time $T_4$) and performing a second operation on the first portion of data during the second cycle at the same time the first execution unit (e.g., execution unit $\mathbf{118}_a$) is reading from the second register file in response to a subsequent instruction being issued. Execution units (e.g., other execution units) of the plurality of execution units 118 continue to read the data from the plurality of register file banks 116 during subsequent cycles until the instruction stream is processed.

Figure 8A:
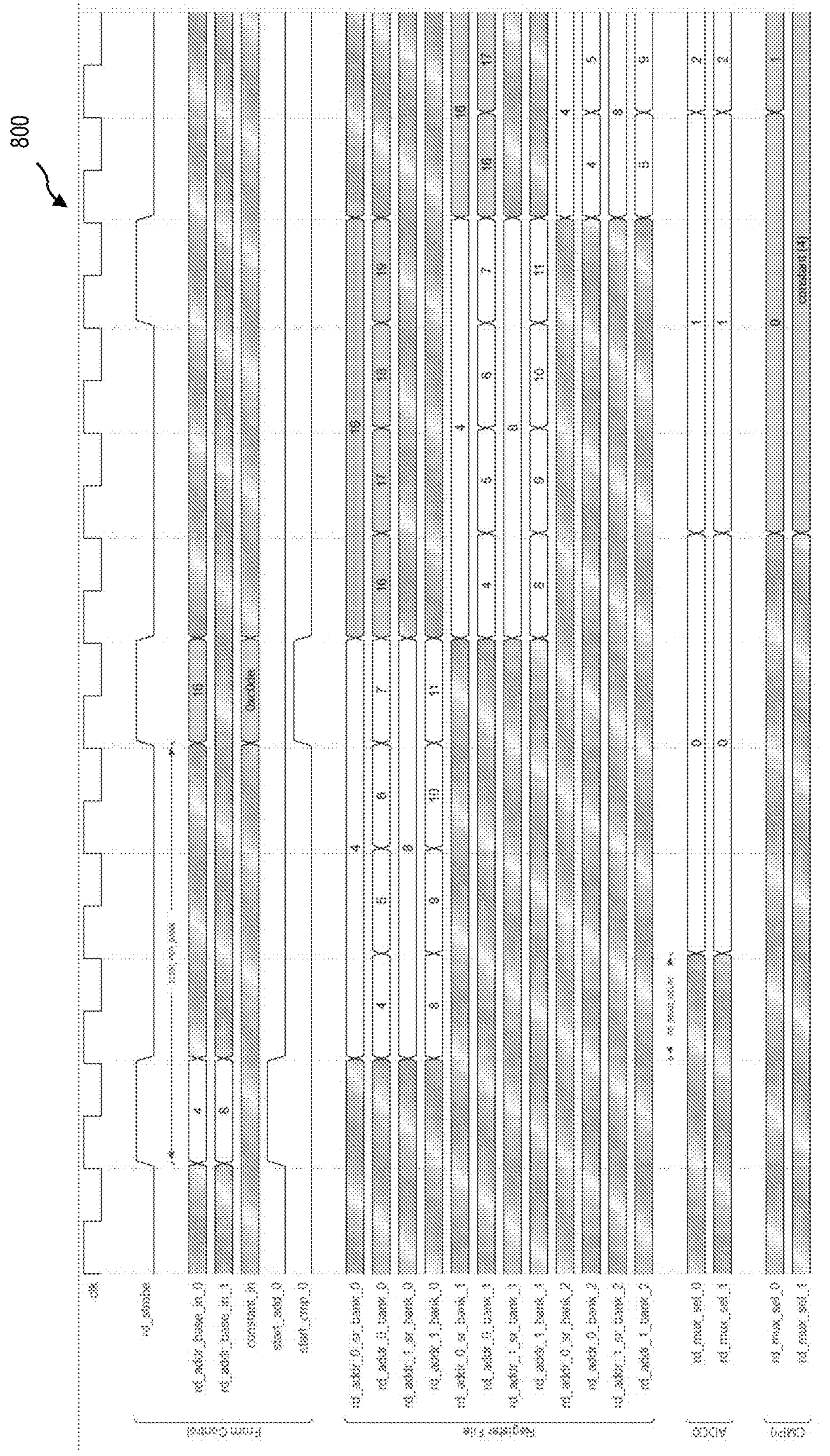
FIGS. 8A and 8B illustrate example timing diagrams of reading from a register file bank performed in accordance with implementations of the present disclosure.
Figure 8B:
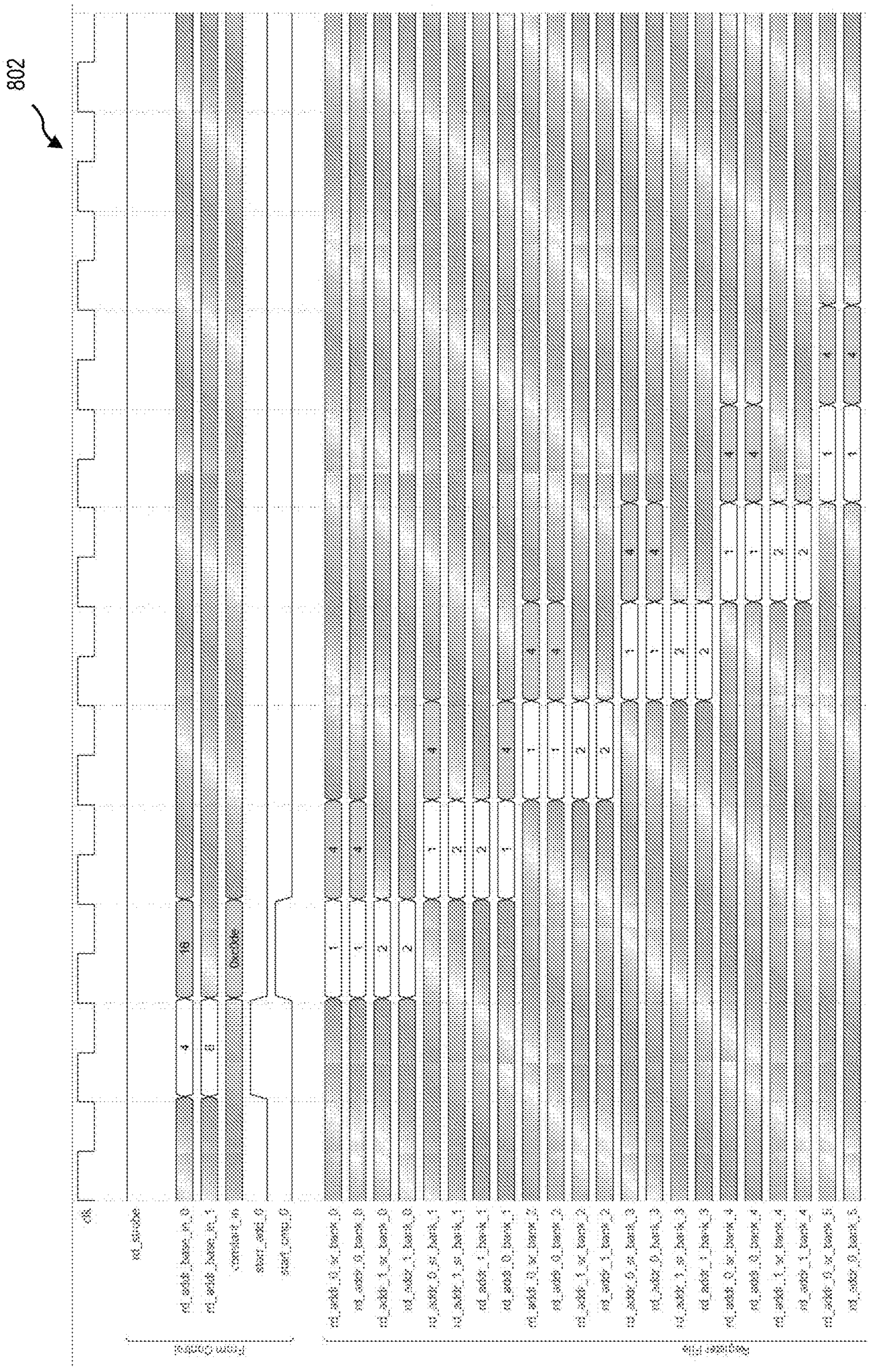

Referring now to FIG. 8A illustrated is an example timing diagram 800 of reading from a register file bank 116 (FIGS. 2 and 3). The timing diagram 800 illustrates the read address per register file bank 116. In the illustrated example, the element per bank (E) is equal to four and the vector processor 102 (FIGS. 2 and 3) has four register file banks 116 in each vector processor lane 112 (corresponding to CHIME=16). There are four elements of a vector in each register file bank. The architectural vector register address is multiplied by four to get the starting address of the physical vector in the bank, and cycle through the next four elements in the bank. FIG. 8B illustrates an example timing diagram 802 of reading from a register file bank 116 (FIGS. 2 and 3) where the element per bank (E) is equal to one.

Figure 9A:
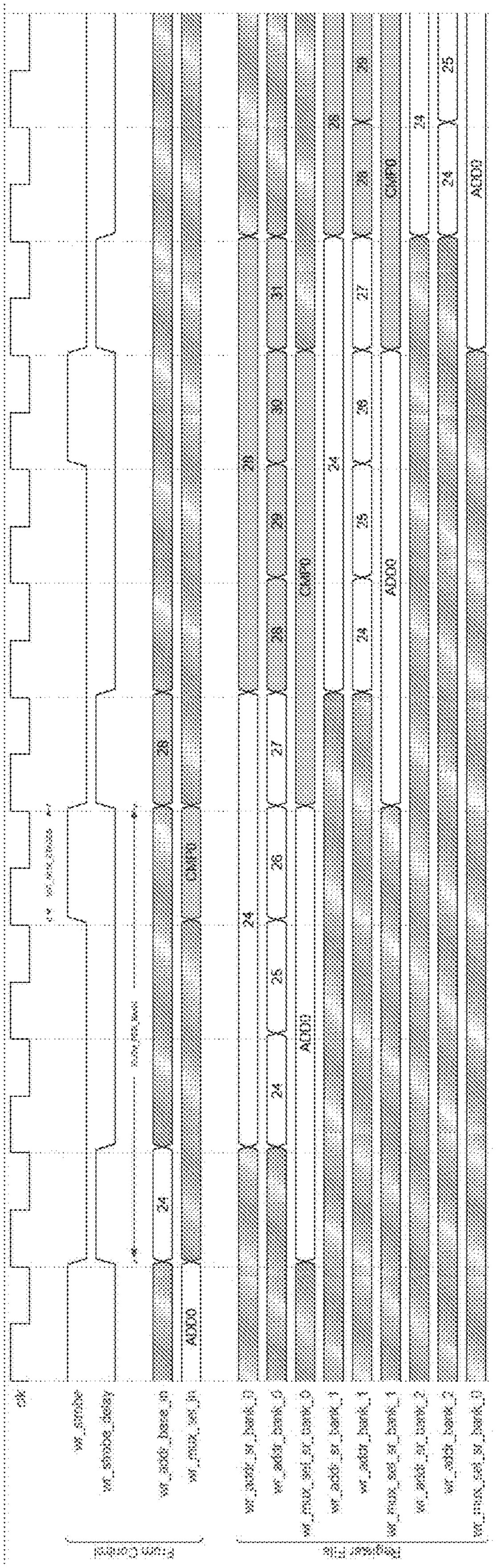
FIGS. 9A and 9B illustrate example timing diagrams of writing to a register file bank in accordance with implementations of the present disclosure.
Figure 9B:
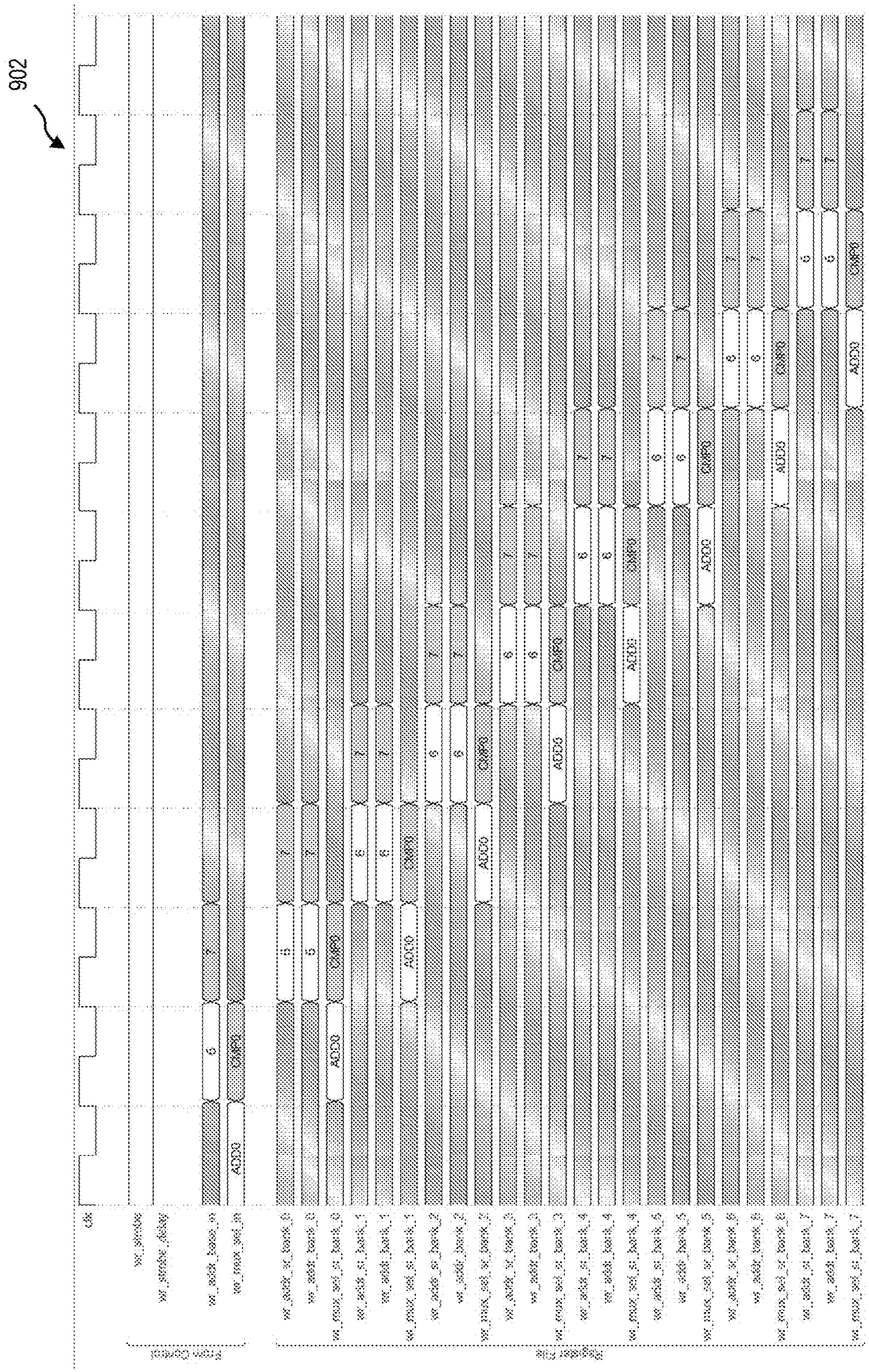

FIG. 9A illustrates an example timing diagram 900 of writing to a register file bank 116 (FIGS. 2 and 3). In the timing diagram 900, the element per bank (E) is equal to four and the vector processor 102 (FIGS. 2 and 3) has eight register file banks 116 (three of the eight register file banks 116 are illustrated in the FIG. 9A) in each vector processor lane 112. FIG. 9B illustrates an example timing diagram 902 of writing to a register file bank 116 where the element per bank (E) is equal to one.

Figure 10A:
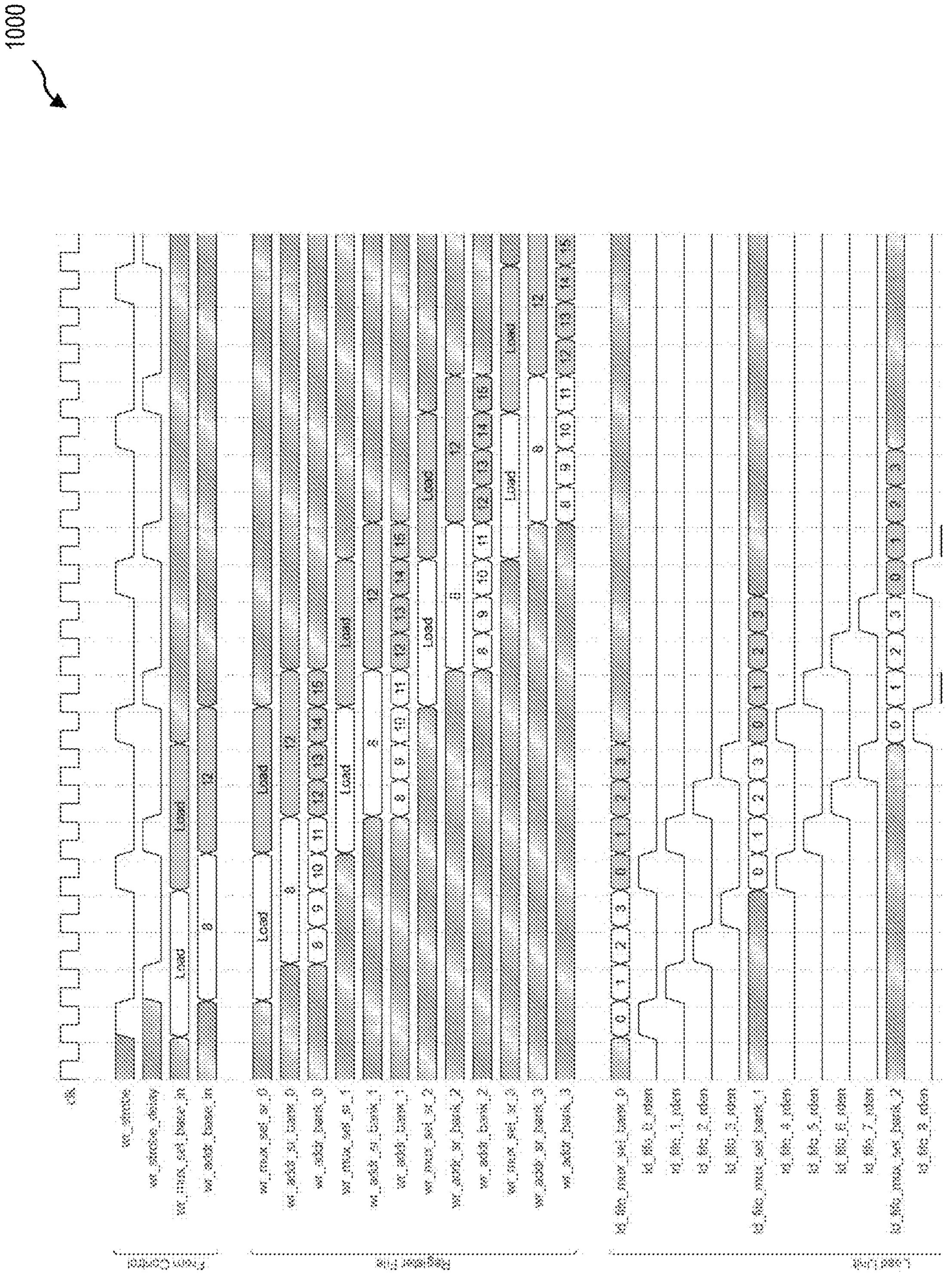
FIGS. 10A and 10B illustrate example timing diagrams of the load unit in accordance with implementations of the present disclosure.
Figure 10B:
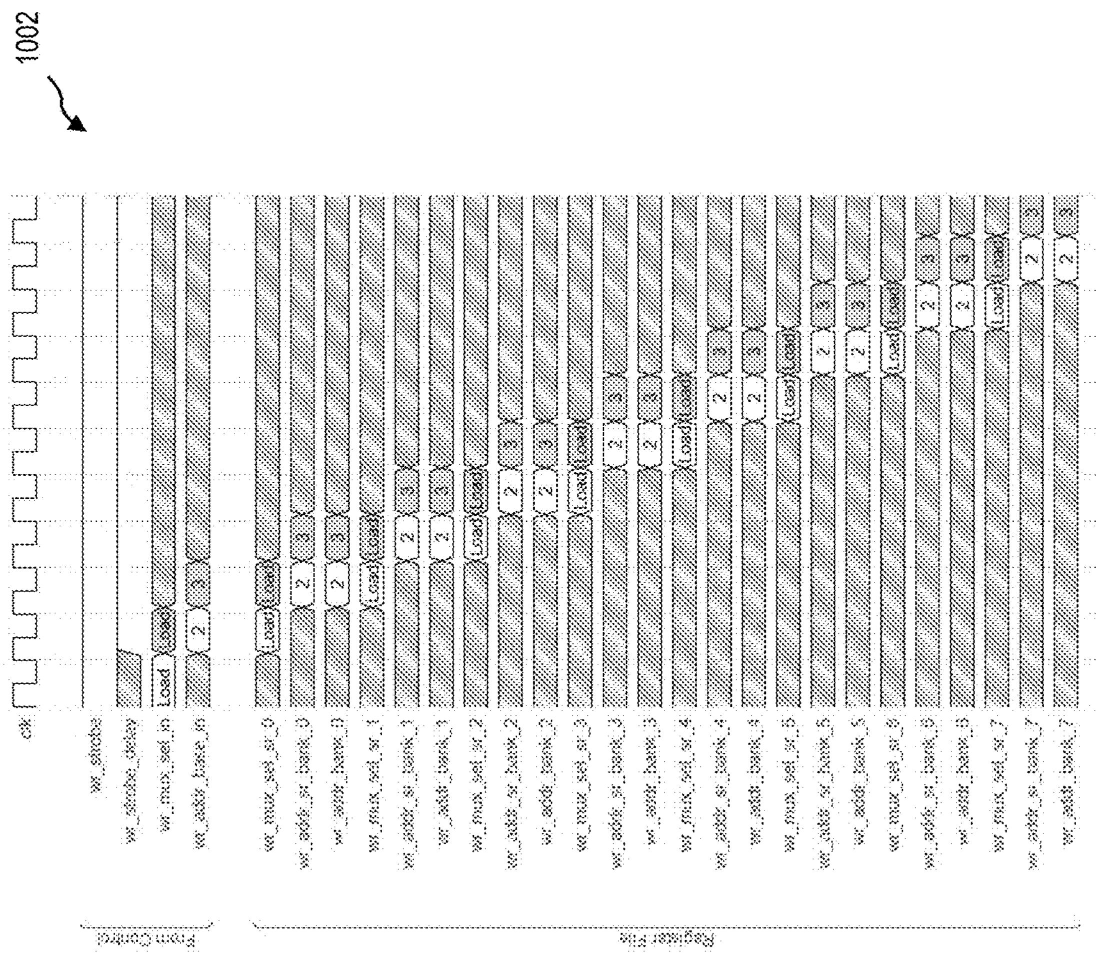

FIG. 10A illustrates an example timing diagram 1000 of a load unit 124 (FIG. 3). In the timing diagram 1000, the element per bank (E) is equal to four and the vector processor 102 (FIGS. 2 and 3) has eight register file banks 116 (three of the eight register file banks 116 are illustrated in FIG. 10A) in each vector processor lane 112. FIG. 10B illustrates an example timing diagram 1002 of a load unit 124 (FIG. 3) where the element per bank (E) is equal to one.

Figure 11A:
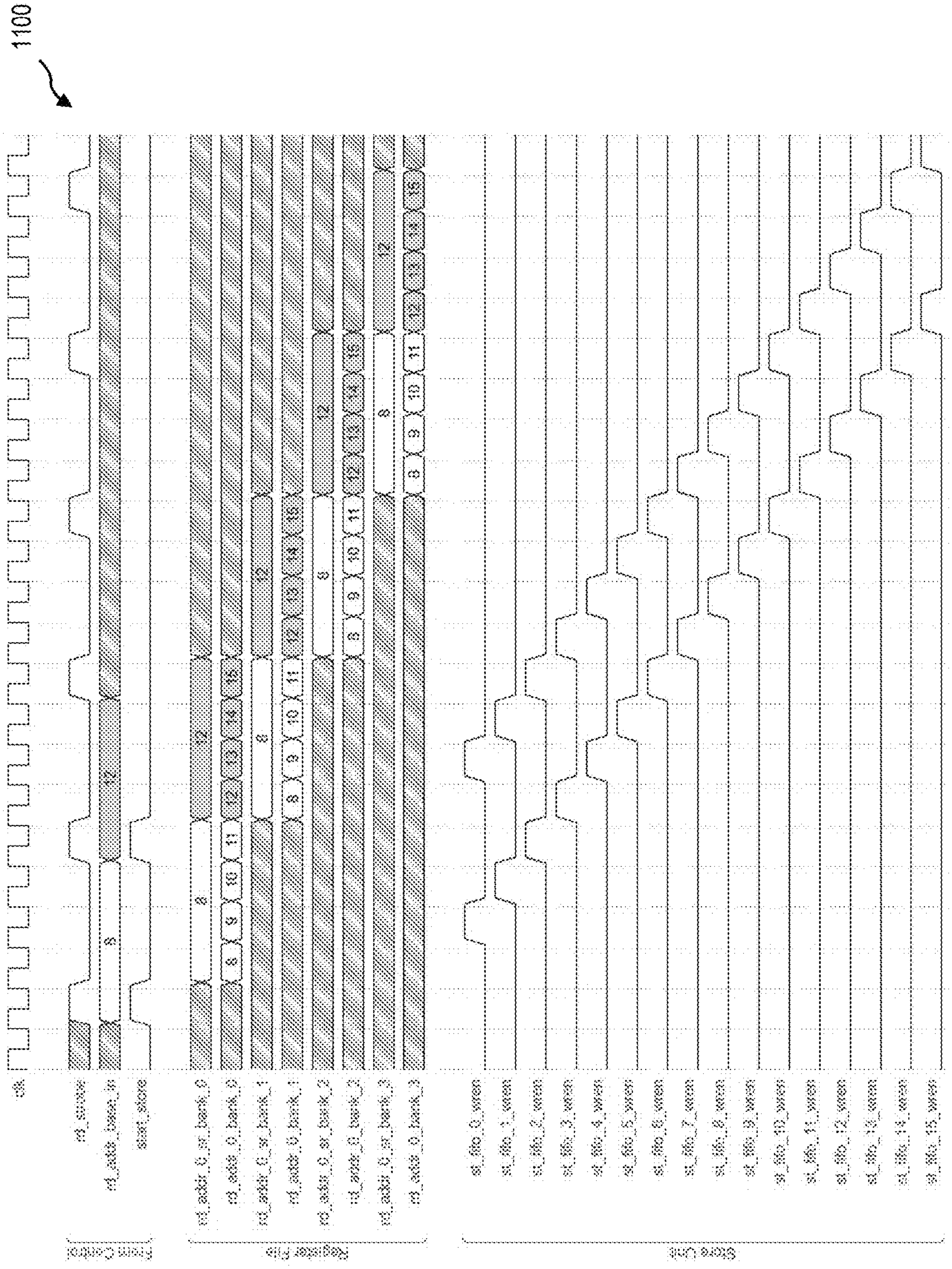
FIGS. 11A and 11B illustrate example timing diagrams of the store unit in accordance with implementations of the present disclosure.
Figure 11B:
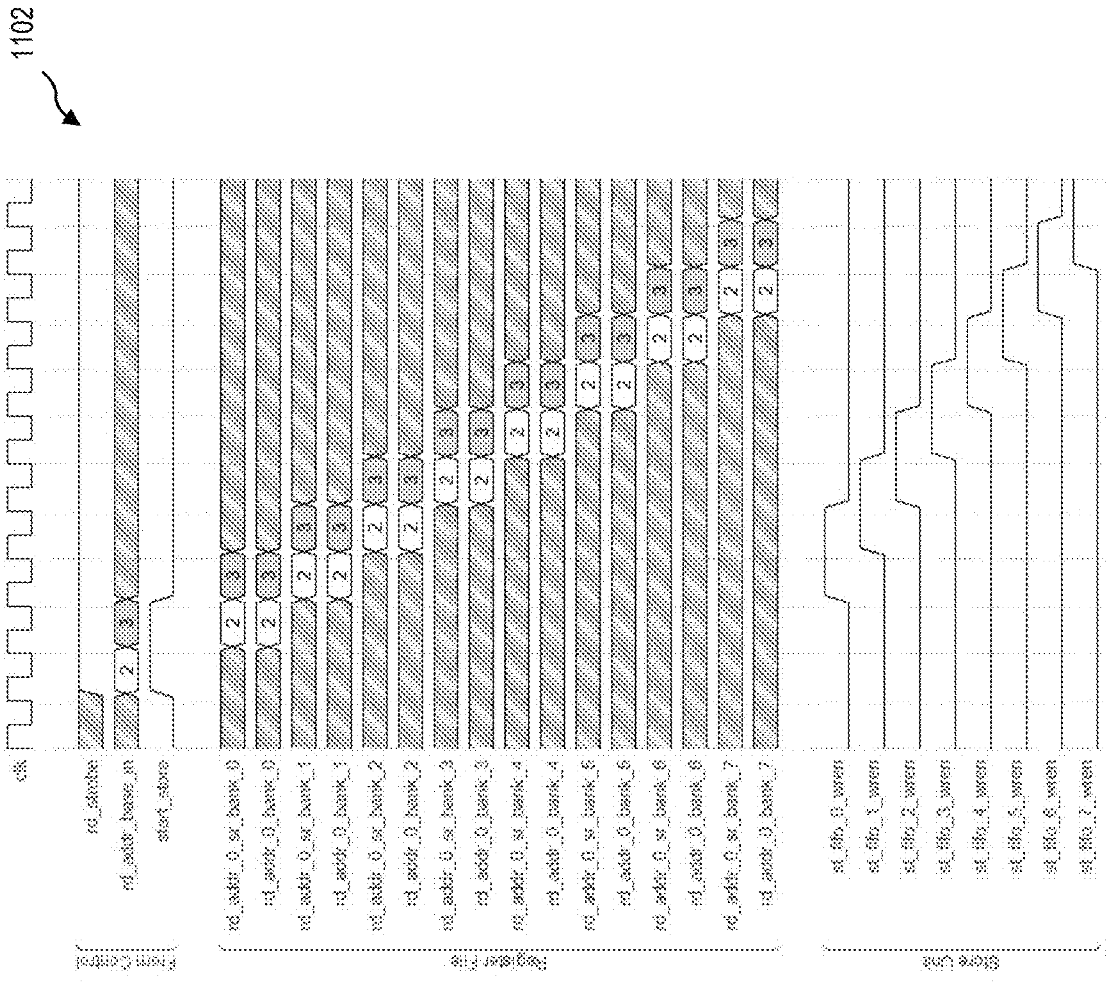

FIG. 11A illustrates an example timing diagram 1100 of a store unit 126 (FIG. 3). In the timing diagram 1100, the element per bank (E) is equal to four and the vector processor 102 (FIGS. 2 and 3) has eight register file banks 116 (three of the eight register file banks 116 are illustrated in FIG. 11A) in each vector processor lane 112. FIG. 11B illustrates an example timing diagram 1102 of a read unit 126 (FIG. 3) where the element per bank (E) is equal to one.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A processor implemented on programmable hardware, comprising:

a vector controller configured to receive instructions for execution on the processor, test for hazards in issuing the instructions using a plurality of hazard trackers where each hazard tracker of the plurality of hazard trackers is configured to track and detect a different type of hazard, and provide control signals to a plurality of vector processor lanes issuing the instructions in response to the plurality of hazard trackers agreeing that no hazards exist during the testing, wherein the plurality of hazard trackers include a structure availability hazard tracker that detects structural hazards, a data available hazard tracker that detects data hazards, and a memory hazard tracker that detects memory hazards, and wherein the testing for hazards further includes receiving, at the memory hazard tracker, an early confirmation of data being read from or written to scratchpad memory banks and resolving memory hazards using the early confirmation of data; and the plurality of vector processor lanes where each vector processor lane of the plurality of vector processor lanes includes:

a vector register file with a plurality of register file banks to store data;

a load unit with a plurality of first in first out queues that loads the data into the plurality of register file banks;

a plurality of execution units configured to perform operations on the data in each of the plurality of register file banks and execute the instructions from an instruction issue queue; and a store unit with a plurality of first in first out queues that reads the data from each of the plurality of register file banks.

2. The processor of claim 1, wherein each vector processor lane of the plurality of vector processor lanes receives a subset of the data and each vector processor lane performs a same operation on the subset of the data in parallel.

3. The processor of claim 1, wherein the control signals and an availability of the plurality of execution units determines an order for each execution unit of the plurality of execution units to read from the plurality of register file banks.

4. The processor of claim 1, wherein each register file bank of the plurality of register file banks includes a portion of the data and each register file bank stores the portion of the data in sequential order.

5. The processor of claim 1, wherein each execution unit includes a multiplexer to select a register file bank of the plurality of register file banks to read the data from during a cycle.

6. The processor of claim 1, wherein the plurality of execution units read the data from the plurality of register file banks in a sequential order starting with a first register file bank and writes the data to the plurality of register file banks in the sequential order starting with the first register file bank.

7. The processor of claim 1, wherein a first execution unit of the plurality of execution units reads the data from the plurality of register file banks in a sequential order starting with a first register file bank at a first cycle and a subsequent execution unit of the plurality of execution units reads the data for a subsequent instruction from the plurality of register file banks in a sequential order starting with the first register file bank in response to the subsequent instruction being issued, and wherein execution units of the plurality of execution units continue to read the data from the plurality of register file banks during subsequent cycles until an instruction stream is processed.

8. The processor of claim 1, wherein each execution unit performs different operations on the data.

9. The processor of claim 1, wherein a subset of the execution units perform a same operation on the data.

10. The processor of claim 1, wherein a number of the plurality of first in first out queues of the load unit equals a number of the plurality of register file banks.

11. The processor of claim 1, wherein a number of the plurality of first in first out queues of the store unit equals a number of the plurality of register file banks.

12. The processor of claim 1, wherein a number of the plurality of execution units is different from a number of the plurality of register file banks.

13. The processor of claim 1, wherein a number of plurality of register file banks is selected in response to a length of a vector and a size of each register file bank is determined using the number of plurality of register file banks and the length of the vector.

14. The processor of claim 1, wherein a number of execution units is selected in response to types of operations needed for the instructions and a number of vector processor lanes is selected in response to performance requirements of the programmable hardware and available space on the programmable hardware.

15. The processor of claim 1, wherein the programmable hardware is a field programmable gate array (FPGA) device and the processor is a vector processor implemented as an overlay on the FPGA device.

16. A method, comprising:

receiving an instruction for execution using a vector processor;

testing for hazards in issuing the instruction using a plurality of hazard trackers where each hazard tracker of the plurality of hazard trackers is configured to track and detect a different type of hazard, wherein the plurality of hazard trackers include a structure availability hazard tracker that detects structural hazards, a data available hazard tracker that detects data hazards, and a memory hazard tracker that detects memory hazards, and wherein the testing for hazards further includes receiving, at the memory hazard tracker, an early confirmation of data being read from or written to scratchpad memory banks and resolving memory hazards using the early confirmation of data;

issuing the instruction in response to the plurality of hazard trackers agreeing that no hazards exist during the testing;

providing, to each vector processor lane of a plurality of vector processor lanes in the vector processor, control signals for the instruction in response to determining to issue the instruction, wherein each vector processor lane performs operations on a subset of data in parallel; and performing, using a plurality of execution units in each vector processor lane, the operations on the data in a plurality of register file banks within each vector processor lane.

17. The method of claim 16, further comprising:

determining to hold the instruction in response to one hazard tracker of the plurality of hazard trackers identifying a hazard during the testing for hazards until the hazard is resolved.

18. The method of claim 16, wherein performing, using the plurality of execution units, the operations further includes:

reading, by one execution unit of the plurality of execution units at a time, a portion of data in each register file bank in sequential order of the plurality of register file banks for a fixed number of cycles and performing an operation on the portion of data in each register file bank during the fixed number of cycles until the data is read from each of the plurality of register file banks.

19. The method of claim 16, wherein the control signals and an availability of the plurality of execution units determines an order for each execution unit of the plurality of execution units to read from the plurality of register file banks.

20. The method of claim 16, wherein the plurality of execution units read the data from the plurality of register file banks in a sequential order starting with a first register file bank and writes the data to the plurality of register file banks in the sequential order starting with the first register file bank.

* * * * *